US011039185B2

(12) United States Patent
Rieger et al.

(10) Patent No.: US 11,039,185 B2
(45) Date of Patent: Jun. 15, 2021

(54) METHODS AND APPARATUS FOR PREDICTIVE DELIVERY OF CONTENT OVER A NETWORK

(71) Applicant: Time Warner Cable Enterprises LLC, St. Louis, MO (US)

(72) Inventors: Remi Rieger, Charlotte, NC (US); Paul D. Brooks, Weddington, NC (US)

(73) Assignee: Time Warner Cable Enterprises LLC, New York, NY (US)

( * ) Notice: Subject to any disclaimer, the term of this patent is extended or adjusted under 35 U.S.C. 154(b) by 107 days.

(21) Appl. No.: 16/105,890

(22) Filed: Aug. 20, 2018

(65) Prior Publication Data

US 2019/0014356 A1    Jan. 10, 2019

Related U.S. Application Data

(60) Division of application No. 14/739,844, filed on Jun. 15, 2015, now Pat. No. 10,057,609, which is a (Continued)

(51) Int. Cl.
*H04N 21/2385* (2011.01)
*H04N 21/426* (2011.01)
(Continued)

(52) U.S. Cl.
CPC ... *H04N 21/2385* (2013.01); *H04N 21/23439* (2013.01); *H04N 21/2402* (2013.01);
(Continued)

(58) Field of Classification Search
CPC ......... H04N 21/23439; H04N 21/2385; H04N 21/2402; H04N 21/251; H04N 21/252;
(Continued)

(56) References Cited

U.S. PATENT DOCUMENTS 5,758,257 A    5/1998 Herz et al.
5,844,552 A    12/1998 Gaughan et al.
(Continued)

FOREIGN PATENT DOCUMENTS

WO    WO-0027044 A2    5/2000
WO    WO-0064174 A1    10/2000
(Continued)

OTHER PUBLICATIONS

MPEG Headers Quick Reference, http://dvd.sourceforge.net/dvdinfo/mpeghdrs.html, Mar. 6, 2006.

*Primary Examiner* — Rong Le
(74) *Attorney, Agent, or Firm* — Gadzinski & Associates, PC

(57) ABSTRACT

Methods and apparatus for optimizing bandwidth utilization in a cable network. In one embodiment, the method comprises predicting which content will be requested by a set of users based upon the exhibited viewing habits of those users (and/or others). A server process gathers viewership data comprising a listing of programs requested by users at various times of the day. The server process aggregates the viewership data, identifies patterns within the aggregated data, and extrapolates a schedule of programs likely to be requested. In certain embodiments, the server process additionally gathers the capabilities of each cable device in an associated subnetwork. Based upon these capabilities, and based upon the total bandwidth predicted to remain available in the network over a target broadcast period, the server process may also select an optimal compression scheme and video quality level before broadcasting a certain program.

20 Claims, 16 Drawing Sheets

Related U.S. Application Data continuation of application No. 12/012,019, filed on Jan. 30, 2008, now Pat. No. 9,060,208.

(51) Int. Cl.
*H04N 21/262* (2011.01)
*H04N 21/25* (2011.01)
*H04N 21/24* (2011.01)
*H04N 21/658* (2011.01)
*H04N 21/6338* (2011.01)
*H04N 21/466* (2011.01)
*H04N 21/2343* (2011.01)

(52) U.S. Cl.
CPC ......... *H04N 21/251* (2013.01); *H04N 21/252* (2013.01); *H04N 21/26216* (2013.01); *H04N 21/26241* (2013.01); *H04N 21/42607* (2013.01); *H04N 21/4667* (2013.01); *H04N 21/6338* (2013.01); *H04N 21/6582* (2013.01)

(58) Field of Classification Search
CPC ....... H04N 21/26216; H04N 21/26241; H04N 21/42607; H04N 21/4667; H04N 21/6582; H04N 21/60; H04N 21/6338; H04N 21/23805; H04N 21/24; H04N 21/26208; H04N 21/6373
See application file for complete search history.

(56) References Cited

U.S. PATENT DOCUMENTS

| | | |
|---|---|---|
| 6,088,722 A | 7/2000 | Herz et al. |
| 6,118,472 A | 9/2000 | Dureau et al. |
| 6,188,687 B1 | 2/2001 | Mussman et al. |
| 6,317,885 B1 | 11/2001 | Fries |
| 6,446,261 B1 | 9/2002 | Rosser |
| 6,463,585 B1 | 10/2002 | Hendricks et al. |
| 6,687,735 B1 | 2/2004 | Logston et al. |
| 7,020,893 B2 | 3/2006 | Connelly |
| 7,171,687 B2 | 1/2007 | Uemura |
| 7,197,472 B2 | 3/2007 | Conkwright et al. |
| 7,266,122 B1 | 9/2007 | Hogg et al. |
| 7,284,064 B1 | 10/2007 | Connelly |
| 7,292,602 B1 | 11/2007 | Liu et al. |
| 7,324,552 B1 | 1/2008 | Galand et al. |
| 7,327,679 B2 | 2/2008 | Naor et al. |
| 7,330,893 B2 | 2/2008 | Qiu et al. |
| 7,334,044 B1 | 2/2008 | Allen |
| 7,336,967 B2 | 2/2008 | Kelly et al. |
| 7,340,759 B1 | 3/2008 | Rodriguez |
| 7,409,140 B2 | 8/2008 | Rodriguez et al. |
| 7,457,520 B2 | 11/2008 | Rosetti et al. |
| 7,500,235 B2 | 3/2009 | Maynard et al. |
| 7,602,820 B2 | 10/2009 | Helms et al. |
| 7,650,619 B2 | 1/2010 | Mineyama |
| 7,787,539 B2 | 8/2010 | Chen |
| 7,831,989 B1 | 11/2010 | Calzone et al. |
| 7,889,765 B2 | 2/2011 | Brooks et al. |
| 7,895,445 B1 | 2/2011 | Albanese et al. |
| 8,015,306 B2 | 9/2011 | Bowman |
| 8,032,914 B2 | 10/2011 | Rodriguez |
| 8,056,103 B2 | 11/2011 | Candelore |
| 8,266,429 B2 | 9/2012 | Helms et al. |
| 8,347,341 B2 | 1/2013 | Markley et al. |
| 8,522,293 B2 | 8/2013 | Gonder et al. |
| 8,582,584 B2 | 11/2013 | Rieger et al. |
| 8,713,623 B2 | 4/2014 | Brooks |
| 8,731,053 B2 | 5/2014 | Karegoudar |
| 9,215,423 B2 | 12/2015 | Kimble et al. |
| 9,270,944 B2 | 2/2016 | Brooks et al. |
| 9,432,710 B2 | 8/2016 | Hill et al. |
| 2001/0039656 A1 | 11/2001 | Nakamura et al. |
| 2001/0050924 A1 | 12/2001 | Herrmann et al. |
| 2002/0013948 A1 | 1/2002 | Aguayo et al. |
| 2002/0026645 A1 | 2/2002 | Son et al. |
| 2002/0032754 A1 | 3/2002 | Logston et al. |
| 2002/0078444 A1 | 6/2002 | Krewin et al. |
| 2002/0087976 A1 | 7/2002 | Kaplan et al. |
| 2002/0123928 A1 | 9/2002 | Eldering et al. |
| 2002/0178446 A1 | 11/2002 | Sie et al. |
| 2003/0018973 A1 | 1/2003 | Thompson |
| 2003/0043789 A1 | 3/2003 | Okajima et al. |
| 2003/0056217 A1 | 3/2003 | Brooks |
| 2003/0126611 A1 | 7/2003 | Chernock et al. |
| 2003/0135853 A1 | 7/2003 | Goldman et al. |
| 2003/0135860 A1 | 7/2003 | Dureau |
| 2003/0140351 A1 | 7/2003 | Hoarty et al. |
| 2003/0142690 A1 | 7/2003 | Beser |
| 2003/0145323 A1 | 7/2003 | Hendricks et al. |
| 2003/0177488 A1 | 9/2003 | Smith et al. |
| 2003/0217365 A1 | 11/2003 | Caputo |
| 2003/0221191 A1 | 11/2003 | Khusheim |
| 2004/0010588 A1 | 1/2004 | Slater et al. |
| 2004/0019913 A1 | 1/2004 | Wong et al. |
| 2004/0057457 A1 | 3/2004 | Ahn et al. |
| 2004/0133701 A1 | 7/2004 | Karaoguz et al. |
| 2004/0133907 A1 | 7/2004 | Rodriguez et al. |
| 2004/0189879 A1 | 9/2004 | Read |
| 2004/0210628 A1 | 10/2004 | Inkinen et al. |
| 2004/0261094 A1 | 12/2004 | Huslak et al. |
| 2005/0002418 A1 | 1/2005 | Yang et al. |
| 2005/0034171 A1 | 2/2005 | Benya |
| 2005/0047501 A1 | 3/2005 | Yoshida et al. |
| 2005/0055685 A1 | 3/2005 | Maynard et al. |
| 2005/0066355 A1 | 3/2005 | Cromer et al. |
| 2005/0202827 A1 | 9/2005 | Demarco et al. |
| 2005/0235307 A1 | 10/2005 | Relan et al. |
| 2005/0240966 A1 | 10/2005 | Hindle et al. |
| 2005/0289618 A1 | 12/2005 | Hardin |
| 2006/0056437 A1 | 3/2006 | Fishwick |
| 2006/0130107 A1 | 6/2006 | Gonder et al. |
| 2006/0140206 A1 | 6/2006 | Kataria et al. |
| 2006/0165173 A1 | 7/2006 | Kim et al. |
| 2006/0171423 A1 | 8/2006 | Helms et al. |
| 2007/0002897 A1 | 1/2007 | Goshen et al. |
| 2007/0022459 A1 | 1/2007 | Gaebel, Jr. et al. |
| 2007/0076728 A1 | 4/2007 | Rieger et al. |
| 2007/0104222 A1 | 5/2007 | Luss |
| 2007/0116048 A1 | 5/2007 | Addington |
| 2007/0121678 A1 | 5/2007 | Brooks et al. |
| 2007/0136753 A1 | 6/2007 | Bovenschulte et al. |
| 2007/0217436 A1* | 9/2007 | Markley ............ H04L 12/2834 370/401 |
| 2007/0298811 A1 | 12/2007 | Hartman et al. |
| 2008/0025219 A1 | 1/2008 | Chao et al. |
| 2008/0038251 A1 | 2/2008 | Pastorekova et al. |
| 2008/0098212 A1 | 4/2008 | Helms et al. |
| 2008/0134165 A1 | 6/2008 | Anderson et al. |
| 2008/0137740 A1 | 6/2008 | Thoreau et al. |
| 2008/0192820 A1 | 8/2008 | Brooks et al. |
| 2008/0235746 A1 | 9/2008 | Peters et al. |
| 2008/0273591 A1 | 11/2008 | Brooks et al. |
| 2009/0010426 A1 | 1/2009 | Redmond |
| 2009/0025027 A1* | 1/2009 | Craner ............... H04N 21/6543 725/32 |
| 2009/0028182 A1* | 1/2009 | Brooks ............... H04L 41/0896 370/466 |
| 2009/0083279 A1 | 3/2009 | Hasek et al. |
| 2009/0183081 A1 | 7/2009 | Rodriguez et al. |
| 2009/0193485 A1 | 7/2009 | Rieger et al. |
| 2009/0213871 A1 | 8/2009 | Carlson et al. |
| 2010/0023972 A1 | 1/2010 | Summers et al. |
| 2010/0083329 A1 | 4/2010 | Joyce et al. |
| 2010/0100915 A1 | 4/2010 | Krikorian et al. |
| 2010/0135646 A1 | 6/2010 | Bang et al. |
| 2010/0312861 A1 | 12/2010 | Kolhi et al. |
| 2010/0313225 A1 | 12/2010 | Cholas et al. |
| 2010/0325666 A1 | 12/2010 | Wiser et al. |
| 2011/0016479 A1 | 1/2011 | Tidwell et al. |
| 2011/0044227 A1 | 2/2011 | Harrang et al. |
| 2011/0090898 A1 | 4/2011 | Patel et al. |
| 2011/0093900 A1 | 4/2011 | Patel et al. |
| 2011/0296046 A1 | 12/2011 | Arya et al. |

(56) References Cited

U.S. PATENT DOCUMENTS

| | | |
|---|---|---|
| 2012/0131623 A1 | 5/2012 | McDysan et al. |
| 2013/0125175 A1 | 5/2013 | Hao et al. |
| 2013/0166690 A1 | 6/2013 | Shatzkamer |

FOREIGN PATENT DOCUMENTS

| | | |
|---|---|---|
| WO | WO-0139505 A2 | 5/2001 |
| WO | WO-0219249 A2 | 3/2002 |
| WO | WO-02080547 A2 | 10/2002 |
| WO | WO-03103292 A1 | 12/2003 |
| WO | WO-2004075489 A1 | 9/2004 |

* cited by examiner

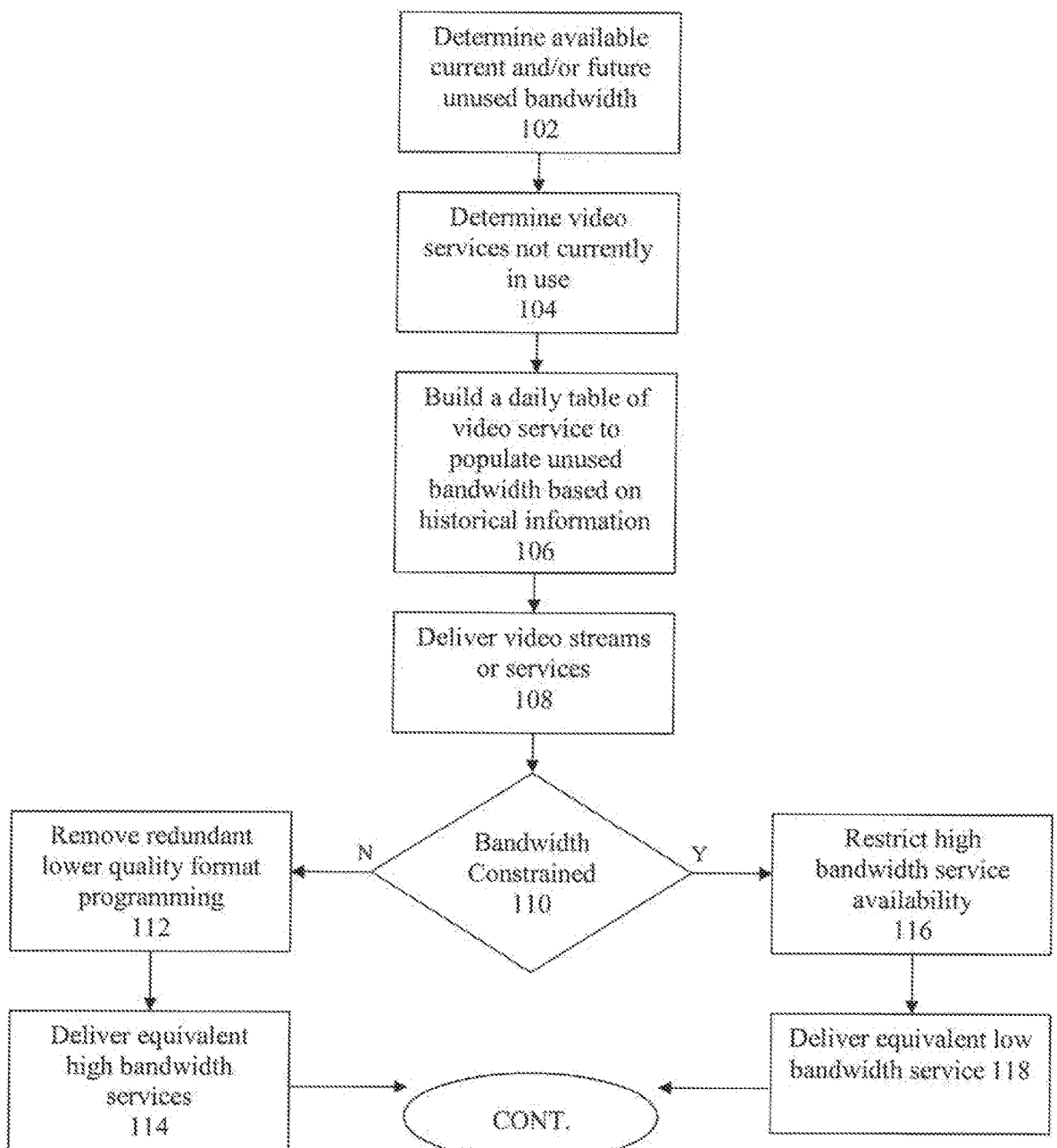

FIG. 8

Viewership data 502(1)

| Chan/Time | 8:00 a.m. | 9:00 a.m. | 10:00 a.m. | 11:00 a.m. | 12:00 p.m. | 1:00 p.m. | 2:00 p.m. | 3:00 p.m. | 4:00 p.m. |
|---|---|---|---|---|---|---|---|---|---|
| 64 | abc | abd | abe | abf | abg | abh | abi | ahk | abl |
| 65 | acc | acd | ace | acf | acg | ach | aci | acj | ack |
| 66 | adc | add | ade | adf | adg | adh | adi | adj | adk |
| 67 | aec | aed | aec | aef | aeg | aeh | aej | aej | aek |
| 68 | afc | afd | afe | aff | afg | afh | afi | afj | afk |

Viewership data 502(2)

| Chan/Time | 8:00 a.m. | 9:00 a.m. | 10:00 a.m. | 11:00 a.m. | 12:00 p.m. | 1:00 p.m. | 2:00 p.m. | 3:00 p.m. | 4:00 p.m. |
|---|---|---|---|---|---|---|---|---|---|
| 64 | abc | abd | abe | abf | abg | abh | abi | ahk | abl |
| 65 | acc | acd | ace | aef | acg | ach | aci | acj | ack |
| 66 | adc | add | ade | adf | adg | adh | adj | adj | adk |
| 67 | aee | aed | aec | aef | aeg | aeh | aej | aej | aek |
| 68 | afc | afd | afe | aff | afg | afh | afh | afj | afk |

Aggregated data 802

| Chan/Time | 8:00 a.m. | 9:00 a.m. | 10:00 a.m. | 11:00 a.m. | 12:00 p.m. | 1:00 p.m. | 2:00 p.m. | 3:00 p.m. | 4:00 p.m. |
|---|---|---|---|---|---|---|---|---|---|
| 64 | abc | abd | abe | abf | abg | abh | abi | abk | abl |
| 65 | acc | acd | ace | aef | acg | ach | aci | acj | ack |
| 66 | adc | add | ade | adf | adg | adh | adj | adj | adk |
| 67 | aee | aed | aec | aef | aeg | aeh | aej | aej | ack |
| 68 | afc | afd | afe | aff | afg | afh | afh | afj | afk |

METHODS AND APPARATUS FOR PREDICTIVE DELIVERY OF CONTENT OVER A NETWORK

PRIORITY AND RELATED APPLICATIONS

This application is a divisional of and claims priority to co-owned, co-pending U.S. patent application Ser. No. 14/739,844 filed on Jun. 15, 2015 of the same title, issuing as U.S. Pat. No. 10,057,609 on Aug. 21, 2018, which is a continuation of and claims priority to co-owned U.S. patent application Ser. No. 12/012,019 filed on Jan. 30, 2008 of the same title, issued as U.S. Pat. No. 9,060,208 on Jun. 16, 2015, each of the foregoing incorporated herein by reference in its entirety. The present application is related to co-owned U.S. patent application Ser. No. 11/243,720 entitled "SELF-MONITORING AND OPTIMIZING NETWORK APPARATUS AND METHODS" filed Oct. 4, 2005 and incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

Field of Invention

The present invention relates generally to the field of network bandwidth prediction and allocation. More particularly, in one exemplary aspect, the present invention makes specific programs available to users of a cable network, wherein bandwidth is predictively and/or statically allocated.

Description of Related Technology

One significant competitive challenge presently faced by network operators relates to managing and conserving bandwidth. This includes the reclamation of otherwise under-utilized or unused bandwidth such that the service and/or customer base can be expanded without significant modifications or build-outs of the underlying network infrastructure. For example, it is clearly desirable to expand the types and availability of "next-generation" network services, including high-definition (HD) broadcast, VOD, high-speed data, VoIP, Interactive TV, etc. over time, without the need for major capital expenditures or system modifications. Hence, network operators are increasingly focused on techniques for "squeezing" as much capacity out of their existing networks as possible.

The foregoing need for bandwidth optimization and reclamation is also applicable to so-called "switched" network architectures. These architectures generally distribute all of the available content provided by the network operator (e.g., MSO) to switches within the network; these switches are then used to selectively provide only those channels actually watched or requested by users to their hubs or nodes for delivery, thereby effectively deleting unwatched channels from the digital broadcast stream. A "deleted" channel is automatically switched back on when a subscriber subsequently selects it, with the switching and delivery transition being for all intents and purposes transparent to the subscriber. This approach has obvious benefits from the standpoint of bandwidth conservation.

Normally, the logic relied upon in a switched network switching algorithm is whether or not a given channel/program is currently being requested, or had been requested in a recent time period. Put differently, the standard switched network does not take advantage of historical viewing patterns or viewing habits in order to determine which content should be provided in the subset of available programming.

Note that video consumption as a function of time changes in two different manners: first, by the number of different channels being consumed, and, second by the type of programming being requested. Thus, the current lineup or type of programming can vary significantly from moment to moment, but the total number of individual programs being delivered may remain the same. However, the actual consumption or use of those programs may vary through, for example, a twenty-four hour viewing period, and it may often be the case that one or more programs are not being viewed at any given time.

In the switched network environment, it is not possible to ascertain with 100% certainty whether a user or group of users are viewing a delivered program. The BSA environment must therefore make certain assumptions about the demand for available programs. Hence, programming can be removed from service inadvertently or a user could maintain a connection to a certain program, stop viewing that program for a certain period of time without disabling the connection, and return to find that connection to that program or program channel no longer available.

One way that networks (including the aforementioned broadcast switched type) can attempt to optimize bandwidth usage is to determine a usage profile for a cable viewer or group of cable viewers as a function of time (or other events). For example, by knowing that usage of particular assets (or the network as a whole) rises and falls at certain times of the day, the network operator can more efficiently allocate bandwidth and schedule activities (such as maintenance and testing). A higher level of granularity of this type of information is desirable; it would clearly be optimal to know what every subscriber in the network was planning on watching or recording at various times of the day in terms of usage patterns. From this information, both individual and aggregated usage patterns could be determined, thereby allowing for maximal "shaping" of the network bandwidth allocation to the actual use patterns. However, this level of information has heretofore been substantially unattainable, due largely to the inability (i) for the consumer premises equipment (CPE) of the subscribers to effectively gather and send information back to the cognizant network operator/entity in a timely fashion, (ii) the network operator/entity to analyze the data to identify usage patterns and trends, and (iii) the network operator/entity to extrapolate from the identified patterns/trends in order make the adjustments necessary to optimize bandwidth allocation.

A number of different approaches to subscriber/client device profiling and bandwidth optimization are evidenced in the prior art. For example, U.S. Pat. No. 6,088,722 to Herz, et al. issued Jul. 11, 2000 entitled "SYSTEM AND METHOD FOR SCHEDULING BROADCAST OF AND ACCESS TO VIDEO PROGRAMS AND OTHER DATA USING CUSTOMER PROFILES" discloses a system and method for scheduling the receipt of desired movies and other forms of data from a network, which simultaneously distributes many sources of such data to many customers, as in a cable television system. Customer profiles are developed for the recipient describing how important certain characteristics of the broadcast video program, movie, or other data are to each customer. From these profiles, an "agreement matrix" is calculated by comparing the recipient's profiles to the actual profiles of the characteristics of the available video programs, movies, or other data. The agreement matrix thus characterizes the attractiveness of each video program, movie, or other data to each prospective customer. "Virtual" channels are generated from the agreement matrix to produce a series of video or data programming which will provide the greatest satisfaction to each customer. Feedback paths are also provided so that the customer's profiles and/or the profiles of the video programs or other data may be modified to reflect actual usage, and so that the data downloaded to the customer's set top terminal may be minimized. Kiosks are also disclosed which assist customers in the selection of videos, music, books, and the like in accordance with the customer's objective profiles. See also U.S. Pat. No. 5,758,257.

U.S. Pat. No. 6,446,261 to Rosser issued Sep. 3, 2002 entitled "SET TOP DEVICE FOR TARGETED ELECTRONIC INSERTION OF INDICIA INTO VIDEO" discloses a method of ostensibly anonymous targeted insertion of indicia into video broadcasts. Individual televisions or other video reception devices are associated with set-top boxes that monitor the usage and viewing habits of the television set or other video reception device. A viewer profile derived from data acquired from said monitoring is created wherein the viewer profile indicates certain characteristics about the viewer. This profile is transmitted to a centralized database, the centralized database being an intermediate link between the origin of the video broadcast and the end viewer. The purpose of the database is to link specific insertable indicia with matching specific viewer profiles. The insertable indicia are encoded directly into the broadcast video and re-broadcast to the end viewer where the set-top box decodes the broadcast video and performs insertion of the indicia. Thus, the system and method allow advertisers to target specific ads or indicia to specific viewing profiles.

U.S. Pat. No. 6,463,585 to Hendricks, et al. issued Oct. 8, 2002 entitled "TARGETED ADVERTISEMENT USING TELEVISION DELIVERY SYSTEMS" discloses a multiple channel architecture designed to allow targeted advertising directed to television terminals connected to an operations center or a cable headend. Program channels carry television programs. During commercial breaks in the television programs, advertisements, which are also broadcast on the program channel, are displayed. However, additional feeder channels carry alternate advertising that may be better suited for certain viewing audiences. The operations center or the cable headend generate a group assignment plan that assigns the television terminals to groups, based on factors such as area of dominant influence and household income. A switching plan is then generated that instructs the television terminals to remain with the program channel or to switch to one of the alternate feeder channels during the program breaks. The television terminals record which channels were viewed during the program breaks, and report this information to the cable headends and the operations center. The reported information is used to generate billing for commercial advertisers, and to analyze viewer watching habits. The invention uses upstream data reception hardware, databases and processing hardware and software to accomplish these functions.

U.S. Patent Application Publication No. 20020032754 to Logston, et al. published Mar. 14, 2002 entitled "METHOD AND APPARATUS FOR PROFILING IN A DISTRIBUTED APPLICATION ENVIRONMENT" discloses a method and apparatus for deriving and characterizing the resource capabilities of client devices in a distributed application (DA) network environment. In a first aspect of the invention, a method and associated architecture for obtaining client device configuration and resource information are disclosed which incorporate a distributed profiling entity having a server portion and client portion, the client portion being used to facilitate query of the client device, and transfer of device resource and configuration information back to the server portion. This information is later used by the profiling entity to alter and update the distribution of entity components between the server and client device. The client device configuration may also be altered if required. In a second aspect of the invention, a method of scaling the aforementioned distributed profiling entity during both initial download and after initiation is disclosed.

U.S. Patent Application Publication No. 20020078444 to Krewin, et al. published Jun. 20, 2002 entitled "SYSTEM AND METHOD FOR THE SCALEABLE DELIVERY OF TARGETED COMMERCIALS" discloses a system for the delivery of targeted advertising wherein a viewer profiling system distributes view profile data to control devices. Insertion orders are broadcast to the control devices or and the control devices store selected insertion orders based on the profile data. Broadcast commercials are displayed according to the acquisition field of the stored insertion orders.

U.S. Patent Application Publication No. 20020123928 to Eldering, et al. published Sep. 5, 2002 entitled "TARGETING ADS TO SUBSCRIBERS BASED ON PRIVACY-PROTECTED SUBSCRIBER PROFILES" discloses the monitoring subscriber viewing interactions, such as television viewing interactions, and generating viewing characteristics therefrom. At least one type of subscriber profile is generated from at least some subset of subscriber characteristics including viewing, purchasing, transactions, statistical, deterministic, and demographic. The subscriber characteristics may be generated, gathered from at least one source, or a combination thereof. Groups of subscribers are formed by correlating at least one type of subscriber profile. The subscriber groups may correlate to elements of a content delivery system (such as head-ends, nodes, branches, or set top boxes (STBs) within a cable TV system). Advertisement profiles are correlated to subscriber/subscriber group profiles, and targeted advertisements selected for the subscribers/subscriber groups based on the correlation. The targeted advertisements are inserted in place of default ads in program streams somewhere within the content delivery system (head-end, node, or STB), and presented to the subscriber/subscriber group via a television.

U.S. Patent Application Publication No. 20030126611 to Chemock, et al. published Jul. 3, 2003 entitled "METHODS AND APPARATUS FOR CONTROLLING INTERACTIVE TELEVISION INFORMATION AND COMMERCE SERVICES" discloses an apparatus for an interactive television commerce environment, acting as a central point of control and information for enabling and facilitating information distribution and transactions in this environment. The apparatus is an element of an interactive television (ITV) commerce system, and enables the introduction of interactive commerce services in cable, satellite, and other broadcast networks. Other services provided include interfacing with off-line interactive advertisements, historical review and tracking services for users, and providing feedback and ITV ad modification capabilities to advertisers. The apparatus, residing at a local headend, can also add to or modify ads by inserting content of local relevance.

U.S. Patent Application Publication No. 20030221191 to Khusheim published Nov. 27, 2003 entitled "SYSTEM AND METHOD FOR DIRECTED TELEVISION AND RADIO ADVERTISING" discloses a method and a device that selects a commercial message for presentation based on user profile criteria. A programming content signal is received at customer premises equipment (CPE). A stored commercial message is selected for presentation during presentation of the programming content signal. The selected commercial message contains summary information related to an informational content of the selected commercial message, and is selected based on the summary information contained by the selected commercial message. Information relating to each commercial message presented and/or an interaction with a user can be recorded and sent to a central location.

One significant issue or disability with the foregoing methods relates to their lack of ability to gather subscriber activity (e.g., tuning and remote control unit) activity and aggregate this data into a historical database. Rather, such prior art approaches are "ethereal" from the standpoint that any data sent back to a supervisory entity (such as the headend) is typically not retained, but rather discarded after receipt. Reasons for this are manifold, including privacy concerns regarding the data and the subscriber from which it was obtained, data storage limitations, and simply the perceived lack of anything useful to do with the data.

Another significant issue with prior art approaches to bandwidth optimization in content-based networks (including the aforementioned broadcast switched architectures) relates to the requirement for manual intervention or input on the part of the network operator (e.g., MSO) in order to make best use of the available bandwidth. Specifically, many such systems require periodic operator adjustment and/or input, which may also include the requirement for periodic evaluation of the subscriber's viewing or tuning habits, and the generation of adjustments to be inserted into the system control functions based thereon. One disability with this approach is the need for constant (or near-constant) operator vigilance. Another disability is latency; the operator is basically always lagging the problem since changes in subscriber habits can occur rapidly, and the efficacy of any corrections made by the operator will in large part depend on the timeliness with which the operator performs his/her analysis and corrective action/adjustment. Greater operator vigilance is also required when the system is approaching the limits of its capacity, since excursions in demand or changes in viewer habits can easily cause an over-demand condition (potentially resulting in a loss of service to one or more subscribers for a period of time).

As previously discussed, another significant issue with the collection of data within a subscriber network is the need to maintain complete privacy and anonymity for individual subscribers from which the profiling information is obtained. Subscribers generally demand complete privacy regarding their viewing habits, type of content viewed, etc. Hence, any commercially practical system must maintain complete privacy. In other types of network paradigms (such as video-on-demand, or VOD), the subscriber's identity and tuner location is essential to instantiating and delivering the requested content, providing "trick mode" functions, billing the correct subscriber, etc. Furthermore, VOD is not a broadcast paradigm, and hence individual streams must be instantiated and generated for each subscriber, adding significant infrastructure and processing overhead.

Co-owned U.S. patent application Ser. No. 11/243,720 entitled "SELF-MONITORING AND OPTIMIZING NETWORK APPARATUS AND METHODS" filed Oct. 4, 2005, issued as U.S. Pat. No. 8,582,584 on Nov. 12, 2013, and previously incorporated herein discloses methods and apparatus for dynamically and automatically allocating network resources through anticipatory analysis and control. In an exemplary embodiment, the network comprises a broadcast switched digital architecture, and network bandwidth allocation to multiple digital program streams is performed by processing historical user tuning data, which is obtained directly from the subscriber's consumer premises equipment (e.g., DSTB). When an increase or decrease in bandwidth required to support certain programs is anticipated, network resource re-allocation is performed automatically by a software process running on the switching server. In this fashion, speculative but "intelligent" projections of bandwidth and program stream requirements can be made automatically by the server software, without operator intervention. The server also optionally dictates the optimal monitoring and data collection parameters to the DSTB.

Co-owned U.S. patent application Ser. No. 10/881,979 entitled "METHOD AND APPARATUS FOR NETWORK BANDWIDTH ALLOCATION" filed Jun. 29, 2004, issued as U.S. Pat. No. 8,843,978 on Sep. 23, 2014, incorporated herein by reference in its entirety, discloses methods and apparatus for assigning bandwidth to a network based on two or more different service levels. In an exemplary embodiment, video on-demand (VOD) session requests within a service group of an HFC cable network are assigned bandwidth such that maximum opportunity is given to grant HD VOD request among SD VOD requests, while meeting the goal of minimizing service disruption by spreading the sessions over multiple QAM channels, and limiting the maximum number of active VOD sessions of any kind.

Another issue for content-based network operators (e.g., cable MSOs) is that relating to non-responding CPE. Specifically, not insignificant portions of the installations in use by the network subscribers may fail to operate properly in terms of reverse or upstream communications. This may result from problems with the CPE itself, interposed cabling, or even network conditions. Such upstream communications are required for various functions within the network including communicating upstream messages (e.g., CPE tuner or power status, request or confirmation messages, etc.) A non-responding CPE exists when it can no longer send messages back to devices on the HFC network due a variety of reasons such as e.g., software issues, cable or connector problems, failure of an HFC network device necessary to communicate with the CPE, CPE hardware failure, upstream RF spectrum has impairments such as noise or interference, etc. It may also be caused by a purposeful configuration change; e.g., installation of a game console or VCR connected in-line that precludes upstream communication. CPE that cannot respond or communicate cause increased subscriber dissatisfaction due to inter alia failure of the CPE to communicate with a hub switch which would otherwise "switch in" the content requested by the subscriber if not otherwise being delivered, and often require a "truck roll" or other service call to rectify the situation (thereby further increasing subscriber frustration and cost to the MSO).

Moreover, while some non-responding CPE are chronic offenders, these issues can also be somewhat migratory or variable in nature; i.e., it is not always the same CPE that is non-responding, thereby making correction of the problem somewhat of a moving target.

Yet a further issue with the prior art is that relating to switching latency. Specifically, in "switched" networks (i.e., those where programs are selectively switched in and out based on user demand), a certain latency exists between the time the subscriber enters a selection (e.g., via their remote control) and the time that the requested program is actually switched on for delivery over one of the QAMs accessible by the CPE. Moreover, a channel map must be generated and transmitted to the CPE, thereby telling it which QAM to tune to in order to receive the requested program stream. The CPE must also receive and read this map, and instruct its tuner to tune to the appropriate QAM. All of the foregoing can impart a significant and perceptible delay, which reduces subscriber satisfaction.

Based on the foregoing, there is a distinct need for improved apparatus and methods that permit the substantially automatic and timely (i) gathering of network usage, viewership and other related data; (ii) storage and transmission of this data to a processing entity within the network, (iii) analysis of the data (including also historical or anecdotal data previously gathered); and (iv) anticipatory control and optimization of network operations based on the data analysis. Such improved apparatus and methods would ideally consider individual program or content elements (i.e., provide a high degree of granularity), and be adaptable to various network paradigms and architectures. They would also take advantage of and leverage the efficiencies provided by different architectures (e.g., the broadcast switched architecture, including its capability for bandwidth conservation via cancellation of unused program streams) where possible.

Moreover, such improved apparatus and methods would ideally allow for delivery of at least some content to subscribers with non-responding CPE, and would reduce switching and processing latency associated with content delivery requests.

SUMMARY OF THE INVENTION

The present invention satisfies the foregoing needs by providing improved methods and apparatus for predictive program delivery and bandwidth management, such as may be used in a cable, DSL or satellite network.

In a first aspect of the invention, an apparatus is disclosed. In one embodiment, the apparatus is for use in a cable television network and adapted to determine which of a plurality of content elements to distribute over the network at a given time. In one variant, the apparatus comprises: logic adapted to receive viewership data from a plurality of cable devices; and logic adapted to determine which of the plurality of content elements are to be delivered over the network to the plurality of cable devices based at least in part upon the viewership data.

In another variant, the viewership data comprises data indicating which of a plurality of channels were requested at given parts of a day.

In yet another variant, the viewership data comprises data indicating which of a plurality of programs were requested at given parts of a day.

In yet a further variant, the apparatus comprise logic adapted to receive capability-related data from at least a portion of the plurality of cable devices. The logic is adapted to determine which of the plurality of content elements are to be delivered makes the determination based at least in part upon the viewership data and based at least in part upon the capability data. The capability data comprises for instance the decoding capabilities of at least a portion of the plurality of cable devices, and the apparatus further comprises logic adapted to select an optimal codec for compressing the content based at least in part upon the decoding capabilities.

In still another variant, the capability data comprises the display resolution capabilities of at least a portion of the plurality of cable devices. The apparatus is further adapted to select an optimal bit rate for transmitting the content based at least in part upon the display resolution capabilities.

In yet a further variant, the logic adapted to determine which of the plurality of content elements are to be delivered is further adapted to discover at least one pattern in the viewership data, and generate at least one prediction or projection based at least in part on the at least one pattern. The at least one pattern comprises for example: (i) a pattern of at least one user requesting content at a certain time of day, (ii) a pattern of at least one user requesting content during a certain day of the week, (iii) a pattern of at least one user requesting content during a certain period of a year, (iv) a pattern of at least one user requesting content provided on a certain channel, (v) a pattern of at least one user requesting content comprising a certain program, or (vi) a pattern of at least one user requesting content comprising programs with popularity ratings exceeding a certain threshold.

In another variant, the apparatus further comprises logic adapted to prioritize respective ones of patterns discovered in the viewership data. The logic adapted to prioritize patterns may be further adapted to assign higher priority to more recent viewing patterns than that assigned to older viewing patterns.

In still a further variant, the apparatus further comprises logic adapted to synthesize patterns discovered in the viewership data so as to create a synthesized pattern, wherein the logic adapted to determine which of the plurality of content elements are to be delivered is further adapted to determine the content to be delivered using at least the synthesized pattern. In another variant, the logic adapted to determine which of the content elements are to be delivered is further adapted to determine the content based at least in part upon the viewership data and bandwidth available in the network at the time of the delivery. Logic may also be provided which is adapted to replace a lower quality version of a content element with a higher quality version of the element, or a higher quality version of a content element with a lower quality version of a content element (such as when insufficient CPE capability exists).

In another embodiment, the apparatus comprises: first logic adapted to receive viewership data from a plurality of client devices; second logic adapted to determine, based at least in part on the viewership data, content elements to deliver over the network at a particular time; and third logic adapted to select at least one content element for delivery that is not predicted to be requested at the particular time.

In one variant, the second logic further comprises: logic adapted to discover at least one request or use pattern in the viewership data; and logic adapted to create at least one prediction based at least in part upon the patterns.

On another variant, the apparatus further comprises logic adapted to prioritize different ones of the patterns discovered in the viewership data over others of the patterns.

In yet another variant, the apparatus further comprises logic adapted to receive capability data from the plurality of client devices; the second logic determines the content elements to be delivered based at least in part upon the capability data.

In a second aspect of the invention, a method of determining which of a plurality of content elements to distribute over a network at a given time is disclosed. In one embodiment, the network comprises a cable television network, and the method comprises: receiving viewership data from a plurality of cable devices; and determining which of the plurality of content elements are to be delivered over the network to the plurality of cable devices based at least in part upon the viewership data.

In one variant, the viewership data comprises data indicating which channels were requested at certain times of day, and/or data indicating which programs were requested at certain times of day.

In another variant, the method further comprises receiving capability data from the plurality of cable devices, wherein the determining which of the plurality of content elements are to be delivered is based at least in part upon the capability data.

In yet another variant, the determining which of the plurality of content elements are to be delivered comprises identifying at least one pattern in the viewership data, and basing the determination at least in park on the at least one pattern. The patterns may also be prioritized or weighted.

In still another variant, determining which of the plurality of content elements to be delivered is based at least in part upon available bandwidth in the network. Moreover, a lower quality version of a content element may be replaced with a higher quality version of the same content element if: (i) each cable device from the plurality can accommodate the higher quality version, and (ii) there is sufficient bandwidth available for replacing the lower quality version with the higher quality version.

Alternatively, a higher quality version of a content element may be replaced with a lower quality version of a content element when: (i) there is insufficient bandwidth available to sustain broadcasting the higher quality version to the plurality of cable devices, or (ii) at least some of the plurality of cable devices are not capable of decoding or utilizing the higher quality version.

In a third aspect of the invention, a method of operating a content-based network is disclosed. In one embodiment, the method comprises: predicting based at least in part on historical data the content elements to be delivered over the network to a plurality of client devices at a given point in time; and operating at least one of the client devices without communicating data from the at least one device to the network.

In one variant, the operating without communicating comprises operating the at least one device without a functional upstream communication channel.

In another variant, the operating at least one of the client devices without communicating data from the at least one device to the network comprises operating different. ones of the plurality of devices without communicating data at different times.

In yet another variant, the act of predicting is based at least in part on viewership data obtained from the plurality of client devices.

In still a further variant, the viewership data comprises data relating to the same time of day, but for different calendar days, and the method further comprises weighting respective ones of the data relating to the same time of day, but for different calendar days, differently.

In a fourth aspect of the invention, client premises apparatus adapted to operate in a content-based network without an upstream communication channel is disclosed. In one embodiment, the apparatus comprises: a network interface, the network interface adapted to at least receive signals from the network, the signals comprising at least one RF carrier having content encoded thereon; an RE tuner; a processor; and a computer program adapted to run on the processor, the computer program comprising a plurality of instructions that when executed: process a received channel or program request; determine, based at least in part on the processing, whether the requested channel or program request can be serviced locally by the apparatus; and if the channel or program request can be serviced locally by the apparatus, causing the tuner to tune to an RE carrier in order to service the request.

In one variant, the determination of whether the request can be serviced locally comprises accessing a local channel map, the channel map comprising at least one association between a program channel and an RF carrier. The local channel map may be e.g., received by the apparatus via the network interface.

In another variant, the local servicing of the request comprises the tuner tuning to an RE carrier currently being delivered, the currently delivered RE carrier comprising the requested channel or program stream. The requested channel or program stream is not presently requested by any other apparatus within the same service group as the client premises apparatus, yet it predictively or speculatively inserted onto the RF carrier currently being delivered.

In a fifth aspect of the invention, apparatus for use in a content based network is disclosed. In one embodiment, the network comprises a cable television network, and the network apparatus is adapted to determine which of a plurality of content elements to distribute over the network at a given time, the apparatus comprising: a processor; and a computer program adapted to run on the processor, the computer program comprising a plurality of instructions which, when executed, determine which of the plurality of content elements to deliver over the network to the plurality of cable devices at a given time based at least in part upon at least a speculative analysis.

In one variant, the speculative analysis comprises a statistical analysis relating to the frequency of insertion of unrequested programs.

In another variant, the speculative analysis comprises a correlation to other programming being inserted at or bearing a predetermined relationship to the given time.

In a sixth aspect of the invention, a method of doing business is disclosed. In one variant, the method comprises: providing a plurality of subscribers to a content-based network; receiving information regarding the viewing habits of at least a portion of the subscribers; and using the information to make predictive or speculative content delivery decisions within the network. The information is provided for example in exchange for consideration.

In one variant, the received information is anonymously provided. For example, the anonymously provided information comprises a cryptographic hash that permits a CPE of the subscribers to be positively identified and associated with a subscriber account.

Other features and advantages of the present invention will immediately be recognized by persons of ordinary skill in the art with reference to the attached drawings and detailed description of exemplary embodiments as given below.

BRIEF DESCRIPTION OF THE DRAWINGS

FIG. 2a is a logical flow diagram illustrating one specific implementation of the generalized method of FIG. 2.

FIG. 8 is a graphical representation of the process and result of aggregating the viewership data of two CPE according to the method of FIG. 7.

DETAILED DESCRIPTION OF THE INVENTION

Figure 1:
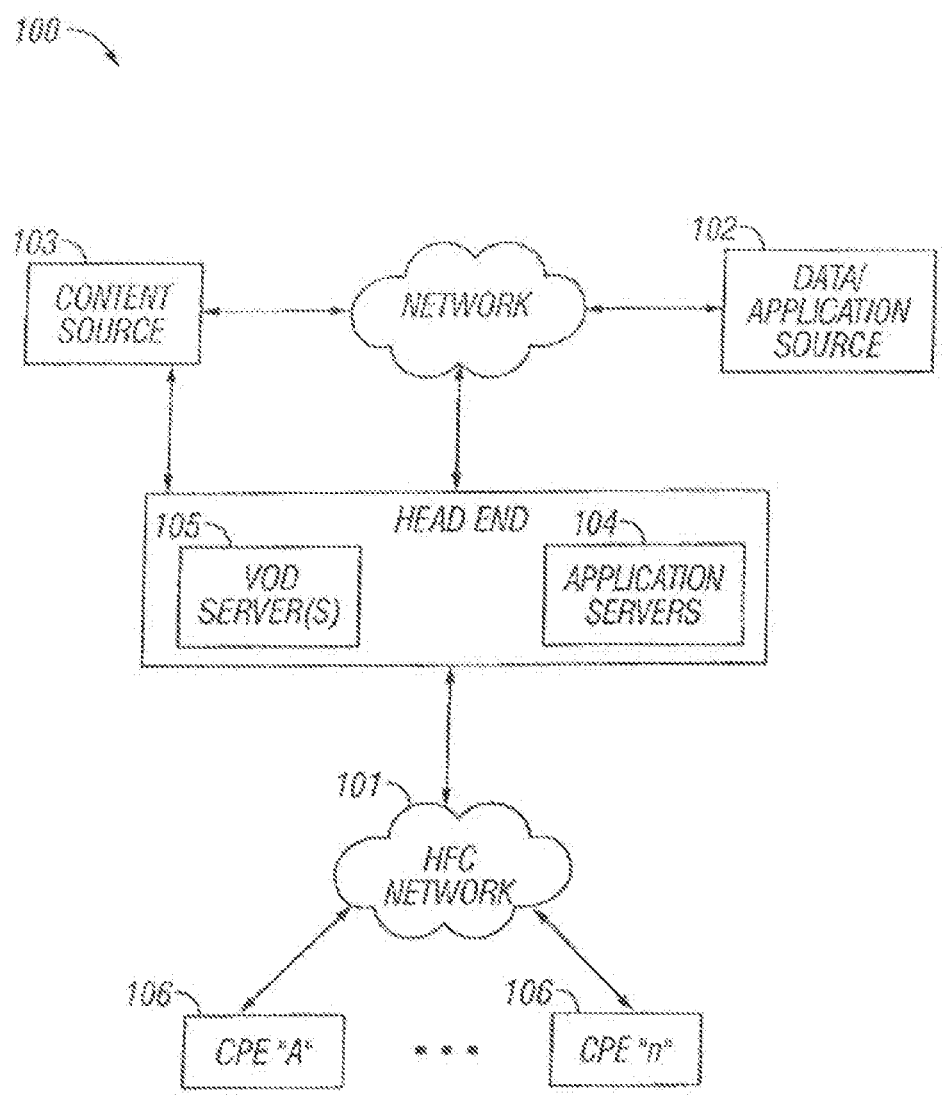
FIG. 1 is a functional block diagram illustrating an exemplary HFC cable network configuration useful with the present invention.

Reference is now made to the drawings wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the terms "client device" and "end user device" include, but are not limited to, set-top boxes (e.g., DSTBs), personal computers (PCs), and minicomputers, whether desktop, laptop, or otherwise, and mobile devices such as handheld computers, PDAs, personal media devices (PMDs), and smartphones.

As used herein, the term "codec" refers to an video, audio, or other data coding and/or decoding algorithm, process or apparatus including, without limitation, those of the MPEG (e.g., MPEG-1, MPEG-2, MPEG-4, etc.), Real (RealVideo, etc.), AC-3 (audio), DiVX, XViD/ViDX, Windows Media Video (e.g., WMV 7, 8, or 9), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

As used herein, the term "conditional access" refers to any access control scheme, whether implemented in hardware, software, or firmware (or combinations thereof), including without limitation members of the "PowerKey™" family, NDS (including VideoGuard, mVideoGuard, etc.), DVB, and Motorola/General Instrument DigiCipher® family (DigiCipher II, etc.). These can be implemented using, for example, CA-specific hardware/software elements embedded in the device, the so-called "CableCARD™" plug-in security module access technology, a downloadable CA system (DCAS), or otherwise.

The terms "Customer Premises Equipment (CPE)" and "host device" refer to any type of electronic equipment located within a customer's or user's premises and connected to a network. The term "host device" refers generally to a terminal device that has access to digital television content via a satellite, cable, or terrestrial network. The host device functionality may be integrated into a digital television (DTV) set. The term "customer premises equipment" (CPE) includes such electronic equipment such as set-top boxes (e.g., DSTBs), televisions, cable modems (CMs), embedded multimedia terminal adapters (eMTAs), whether stand-alone or integrated with other devices, Digital Video Recorders (DVR), gateway storage devices Furnace and ITV Personal Computers.

As used herein, the terms "display" and "monitor" mean any type of device adapted to display information, including without limitation CRTs, LCDs, TFTs, plasma displays, LEDs, incandescent and fluorescent devices.

As used herein, the term "DVI" (digital video interface) refers generally to any type of interface (e.g., hardware and/or software) adapted to provide interface and/or conversion between different formats or domains, including without limitation interfaces compliant with the Digital Display Working Group (DDWG) DVI specification (e.g., DVI-A, DVI-D, and DVI-I). For example, using a DVI connector and port, a digital signal sent to an analog monitor is converted into an analog signal; if the monitor is digital, such as a flat panel display, no conversion is necessary. A DVI output is an option in OpenCable compliant hardware that provides a high-definition TV (HDTV) output which includes copy protection.

As used herein, the term "DVR" (digital video recorder) refers generally to any type or recording mechanism and/or software environment whereby content sent over a network can be recorded and selectively recalled. Such DVR may be dedicated in nature, or part of a non-dedicated or multi-function system.

As used herein, the term "DOCSIS" refers to any of the existing or planned variants of the Data Over Cable Services Interface Specification, including for example DOCSIS versions 1.0, 1.1, 2.0 and 3.0, DOCSIS (version 1.0) is a standard and protocol for internet access using a "digital" cable network. DOCSIS 1.1 is interoperable with DOCSIS 1.0, and has data rate and latency guarantees (VoIP), as well as improved security compared to DOCSIS 1.0. DOCSIS 2.0 is interoperable with 1.0 and 1.1, yet provides a wider upstream band (6.4 MHz), as well as new modulation formats including TDMA and CDMA. It also provides symmetric services (30 Mbps upstream).

As used herein, the term "headend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, and the Internet. DSTBs may literally take on any configuration, and can be retail devices meaning that consumers may or may not obtain their DSTBs from the MSO exclusively. Accordingly, it is anticipated that MSO networks may have client devices from multiple vendors, and these client devices will have widely varying hardware capabilities. Multiple regional headends may be in the same or different cities.

As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices DRAM, SRAM, DDRAM, EEPROM/Flash, ROM), digital processors, SoC devices, FPGAs, ASICs, ADCs, DACs, transceivers, memory controllers, and other devices, as well as any combinations thereof.

As used herein, the terms "Internet" and "internet" are used interchangeably to refer to inter-networks including, without limitation, the Internet.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RG cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the terms "network agent" and "network entity" refers to any network entity (whether software, firmware, and/or hardware based) adapted to perform one or more specific purposes. For example, a network agent or entity may comprise a computer program running in server belonging to a network operator, which is in communication with one or more processes on a CPE or other device.

As used herein, the term "node" refers without limitation to any location, functional entity, or component within a network.

As used herein, the term "QAM" refers to modulation schemes used for sending signals over cable networks. Such modulation scheme might use any constellation level (e.g. QPSK, 16-QAM, 64-QAM, 256-QAM, etc.) depending on details of a cable network. A QAM may also refer to a physical channel modulated according to the schemes.

As used herein, the term "network interface" refers to any signal, data, or software interface with a component, network or process including, without limitation, those of the Firmwire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), WiFi (802.11a,b,g,n), WiMAX (802.16), PAN (802.15), or IrDA families.

As used herein, the term "program channel" is generally synonymous with the concept. of a perceived stream of information. For example, a program/user channel might comprise "Channel 3" which carries the content of a given network (e.g., NBC). This is to be distinguished from a physical channel, which is used to physically carry and distribute the content, which may for example comprise one or more QAMs within a given portion of the RF spectrum of a cable system.

As used herein, the terms "request", "requested", "requesting" should be taken to include both requests to view content instantaneously (such as immediately on a television screen), and requests to have content recorded for future viewing (such as by a DVR recording).

As used herein, the term "server" refers to any computerized component, system or entity regardless of form which is adapted to provide data, files, applications, content, or other services to one or more other devices or entities on a computer network.

As used herein, the terms "service", "content", and "stream" are sometimes used synonymously to refer to a sequence of packetized data that is provided in what a subscriber may perceive as a service. A "service" (or "content", or "stream") in the former, specialized sense may correspond to different types of services in the latter, non-technical sense. For example, a "service" in the specialized sense may correspond to, among others, video broadcast, audio-only broadcast, pay-per-view, or video-on-demand. The perceivable content provided on such a "service" may be live, pre-recorded, delimited in time, undelimited in time, or of other descriptions. In some cases, a "service" in the specialized sense may correspond to what a subscriber would perceive as a "channel" in traditional broadcast television.

As used herein, the term "storage device" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "user interface" refers to, without limitation, any visual, graphical, tactile, audible, sensory, or other means of providing information to and/or receiving information from a user or other entity, such as a GUI.

As used herein, the term "wireless" means any wireless signal, data, communication, or other interface including without limitation WiFi, Bluetooth, 3G, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Overview

In one exemplary aspect, the methods and apparatus of the present invention provide switched architecture networks with enhanced network bandwidth utilization and reduced switching latency by maintaining and analyzing historical viewing or use information derived from that network. This information can then be used to fill the bandwidth that is not currently being consumed via consumer requests with programming that is predictively selected. These patterns may be evidenced, for example, in a listing of programs or program channels viewed during a given day, week, month, time, or season of the year. In this manner, user viewing behavior is accurately modeled in order to better allocate available bandwidth. Additionally, the chances of overloading the switched network bandwidth with an inordinate amount of non-viewed programming are significantly reduced.

Various embodiments of the present invention may also reduce the need to instantaneously satisfy unanticipated programming requests and thereby reduce the processing power requirements on servers, network switches and QAM banks. As previously described, when a subscriber tunes to a deleted channel, the deleted channel must be switched on. Upstream communications and processing may introduce significant latencies, as well as consuming significant processing power at the switch or other such processing entity. Advantageously, in accordance with the present invention, the number of unanticipated programming requests will be significantly reduced. This is largely because the content actually delivered to the user's CPE (versus merely the switch) will be based on patterns of viewing behavior that have already been exhibited. Viewers will not need to initiate requests that would require programming to be made available instantaneously. Instead, these users need only tune to programming that is already being delivered over an active QAM. The resulting reduction of unnecessary switching at the hub reduces the load on the network switching infrastructure significantly.

The methods and apparatus disclosed herein are especially useful when programming consumption changes dramatically over time. For example, primetime viewing typically comprises the maximum number of programs and the maximum diversity of programs. This differs substantially from the demand during early morning viewing and from that of other viewing periods. Thus, various embodiments of the present invention will take these viewing trends into account in determining which "unrequested" content to provide to a given group of users.

In situations where bandwidth varies throughout the day based on the total number of different program channels being requested, various embodiments of the present invention predictively load and/or anticipate program channels in the provided service in order to maintain the proper allocation of total bandwidth, even between different services (e.g., switched delivery and VoD). This is especially useful on occasions where programming bandwidth varies significantly, for instance, between standard definition and high definition programming. Thus, according to some embodiments, high definition versions of programs are used to replace low definition versions at times where sufficient bandwidth is predicted to be available. Similarly, low definition versions can selectively replace high definition versions if it is predicted that there will be insufficient bandwidth to support a high definition broadcast, and/or the requesting CPE do not have the capacity to process HD encoded signals.

Exemplary software architectures, operations and business "rules engines", and business methodologies, are also disclosed.

DETAILED DESCRIPTION OF EXEMPLARY EMBODIMENTS

Exemplary embodiments of the apparatus and methods of the present invention are now described in detail. While these exemplary embodiments are described in the context of the aforementioned hybrid fiber coax (HFC) cable system architecture having an multiple systems operator (MSO), digital networking capability, and plurality of client devices/CPE, the general principles and advantages of the invention may be extended to other types of networks and architectures, whether broadband, narrowband, wired or wireless, or otherwise, the following therefore being merely exemplary in nature.

It will also be appreciated that while described generally in the context of a consumer (i.e., home) end user domain, the present invention may be readily adapted to other types of environments (e.g., commercial/enterprise, government/military, etc.) as welt. Myriad other applications are possible.

It is also noted that while the following discussion is cast primarily in terms of two service levels (i.e., SD and HD), the methods and apparatus disclosed herein can be extended to other numbers and types of service levels. For example, it is foreseeable that yet even higher levels of definition may be employed in the future (e.g., "ultra-high definition" or UHD), thereby allowing intelligent bandwidth conservation between three service levels (SD, HD, and UHD). As another option, multiple levels or rates may be present with one of the aforementioned service levels, such as where the SD level includes levels SD1, SD2, . . . SDn, and/or the HD level similarly includes HD1, HD2, . . . HDn, with each of these sub-levels having different data rates and/or other characteristics. Alternatively, bandwidth conservation according to the present invention may be performed not based on definition level (data rate), but some other attribute such as for example the selective availability of a type of service (e.g., OD, IPTV, or DVR/PVR). Various alternate conservation schemes are described subsequently herein in greater detail.

It is further noted that while described primarily in the context of a cable system with 6 MHz RF channels, the present invention is applicable to literally any network topology or paradigm, and any frequency/bandwidth, such as for example 8 MHz channels. Furthermore, as referenced above, the invention is in no way limited to traditional cable system frequencies (i.e., below 1 GHz), and in fact may be used with systems that operate above 1 GHz band in center frequency or bandwidth, to include without limitation so-called ultra-wideband systems.

Also, while certain aspects are described primarily in the context of the welt-known Internet Protocol (described in, inter alia, RFC 791 and 2460), it will be appreciated that the present invention may utilize other types of protocols (and in fact bearer networks to include other internets and intranets) to implement the described functionality.

FIG. 1 illustrates a typical content-based network configuration with which the anticipatory or predictive network control and operation methodology of the present invention may be used. The various components of the network 100 include (i) one or more data and application origination points 102; (ii) one or more content sources 103, (iii) one or more application distribution servers 104; (iv) one or more VOD servers 105, and (v) consumer premises equipment (CPE) 106. The distribution server(s) 104, VOD servers 105 and CPE(s) 106 are connected via a bearer (e.g., HFC) network 101. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the invention. For example, the head-end architecture of FIG. 1a (described in greater detail below) may be used.

The data/application origination point 102 comprises any medium that allows data and/or applications (such as a VOD-based or "Watch TV" application) to be transferred to a distribution server 104. This can include for example a third party data source, application vendor website, CD-ROM, external network interface, mass storage device RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the distribution server 104) that can be accessed by a distribution server 104. Such CPEs 106 comprise processors and associated computer memory adapted to store and run the downloaded or resident application, as well as receive the streamed in-band content. For example, "Watch TV" or similar applications or their components (or updates thereto) of the type described subsequently herein with reference to FIG. 6 can be downloaded to the CPE as required. For example, co-owned U.S. patent application Ser. No. 10/655,655 filed Sep. 5, 2003 and entitled "Technique For Updating A Resident Application And Associated Parameters In A User Terminal Through A Communications Network", issued as U.S. Pat. No. 7,500,235 on Mar. 3, 3009, incorporated herein by reference in its entirety, describes one exemplary technique and architecture for updating applications resident on network CPE.

Moreover, the CPE can be provisioned remotely according by a network entity; see, e.g., co-owned and co-pending U.S. patent application Ser. No. 11/607,663 entitled "METHODS AND APPARATUS FOR SOFTWARE PROVISIONING OF A NETWORK DEVICE" filed Dec. 1, 2006, incorporated herein by reference in its entirety, which describes exemplary methods and apparatus for software provisioning (e.g., installation/update) of a CPE within a network.

Figure 1A:
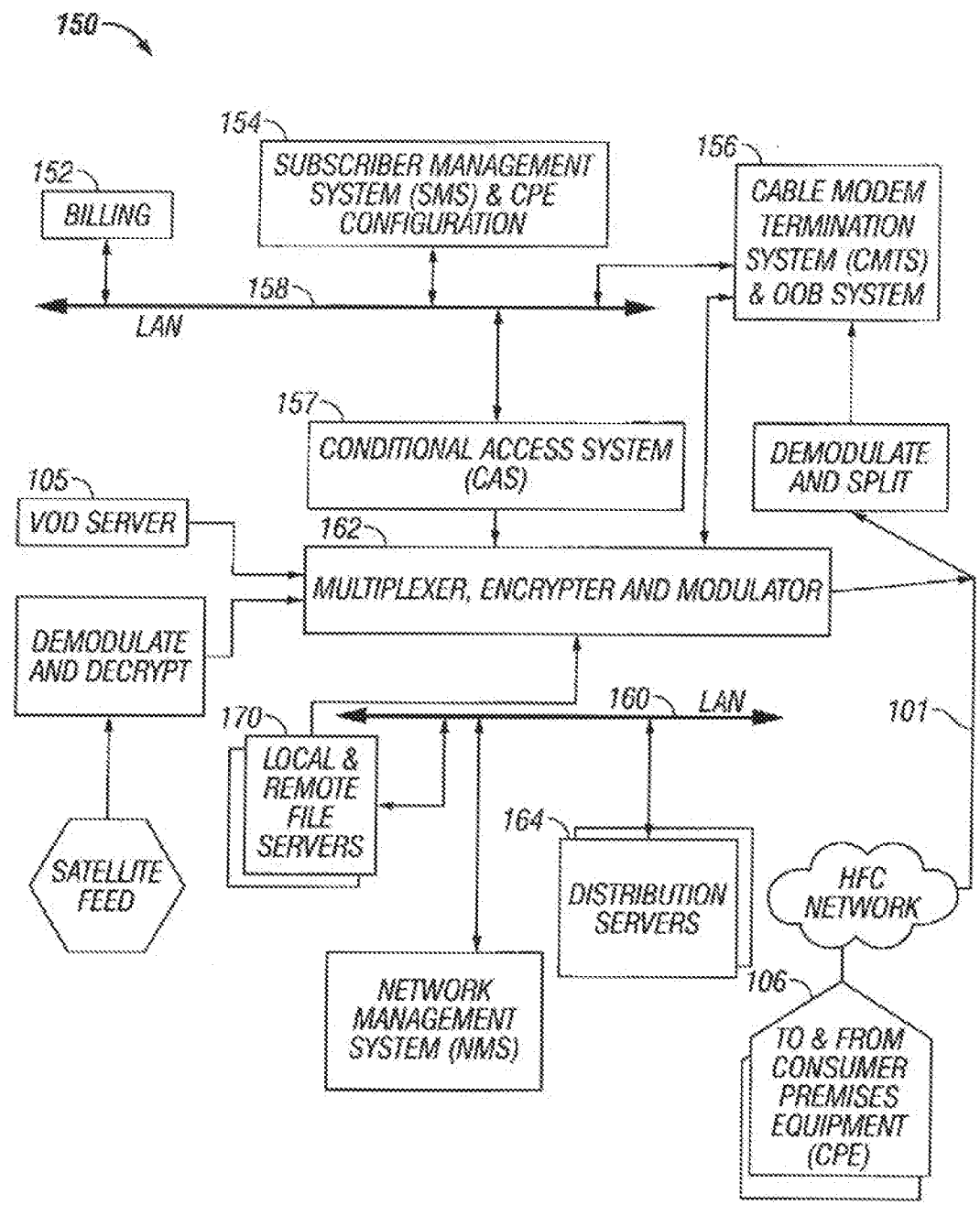
FIG. 1a is a functional block diagram illustrating one exemplary HFC cable network head-end configuration useful with the present invention.

Referring now to FIG. 1a, one exemplary embodiment of a head-end architecture useful with the present invention is described. As shown in FIG. 1a, the head-end architecture 150 comprises typical head-end components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the head-end configuration depicted in FIG. 1a is high-level, conceptual architecture and that each MSO may have multiple head-ends deployed using custom architectures.

The architecture 150 of FIG. 1a further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the head-end must be adapted to acquire the information for the carried channels from various sources. Typically, the channels being delivered from the head-end 150 to the CPE 106 ("downstream") are multiplexed together in the head-end and sent to neighborhood hubs (FIG. 1b) via a variety of interposed network components.

Content (e.g., audio, video, etc.) is provided in each downstream (in-band) channel associated with the relevant service group. To communicate with the head-end or intermediary node (e.g., hub server), the CPE 106 may use the out-of-band (OOB) or DOCSIS channels and associated protocols. The OCAP 1.0 (and subsequent) specification provides for exemplary networking protocols both downstream and upstream, although the invention is in no way limited to these exemplary approaches.

In another embodiment, the network infrastructure includes one or more on-demand file or "carousel" functions. The present invention contemplates that not only will more traditional movie (e.g., MPEG) broadcast data be delivered though the mechanisms described herein, but also data for interactive applications or other types of applications.

It will also be recognized that the multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

Contention for available edge QAM resources between these various servers can also be arbitrated via the mechanisms described herein. For example, contention for edge QAMs can be arbitrated between the broadcast switched architecture (BSA; see discussion of "switched" network below) and VOD subsystems of the network. It will be recognized that these contending subsystems may have different operational paradigms as well. For example, the aforementioned exemplary BSA system is in effect a real-time system, whereas the VOD system is not. Hence, the present invention provides a mechanism for arbitrating these resources that avoids the difficulties of other approaches *such as, e.g., trying to arbitrate on a "session" basis.
"Switched" Networks—

Figure 1B:
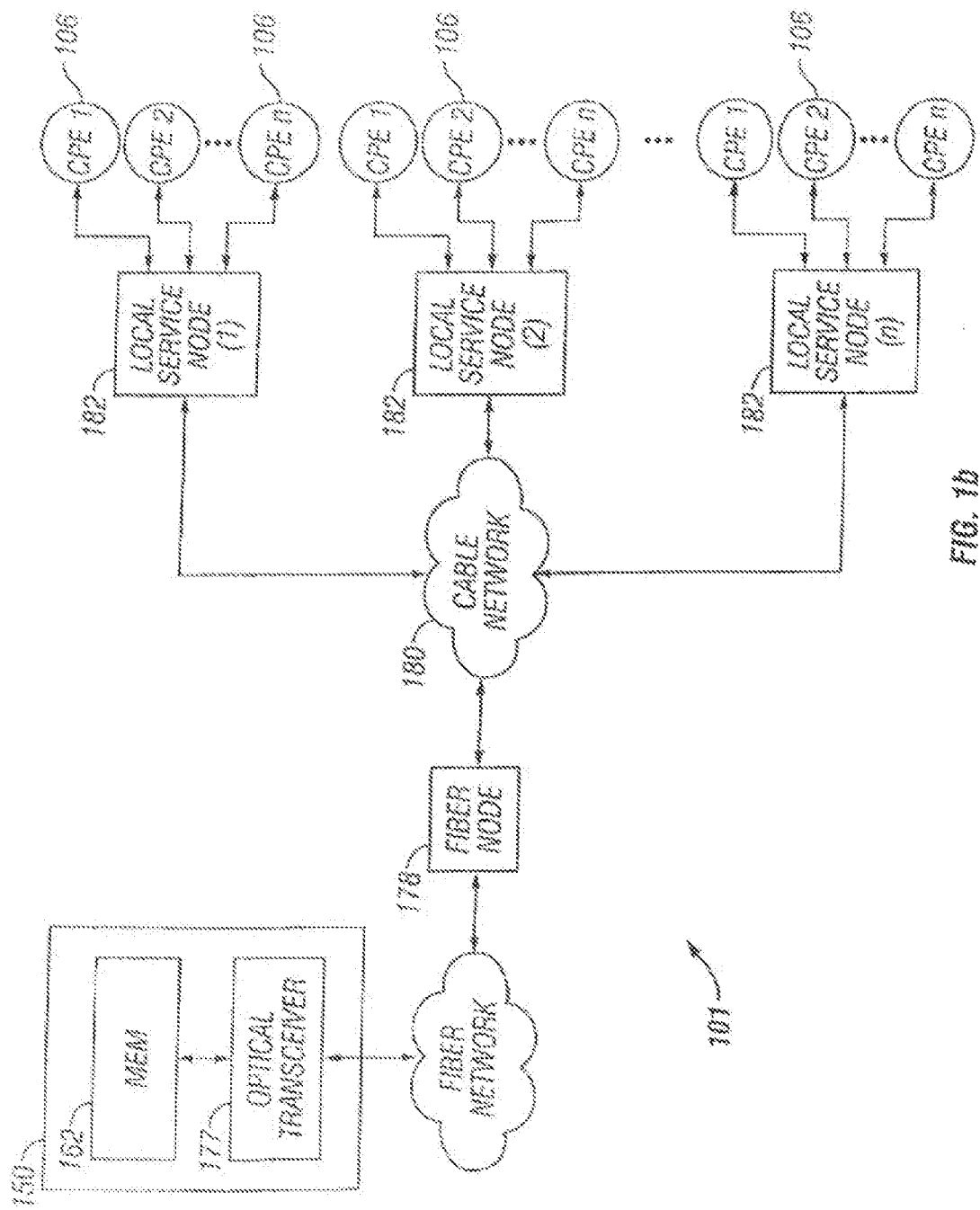
FIG. 1b is a functional block diagram illustrating one exemplary local service node configuration useful with the present invention.
Figure 16:
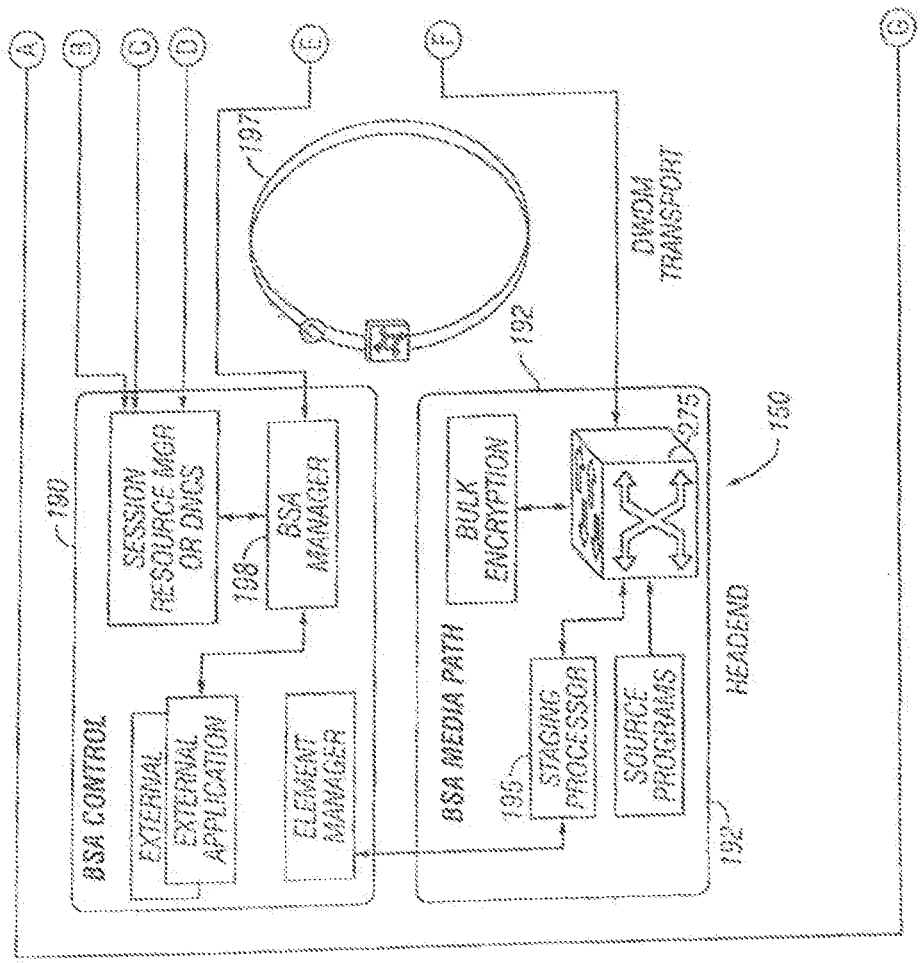
Figure 1C:
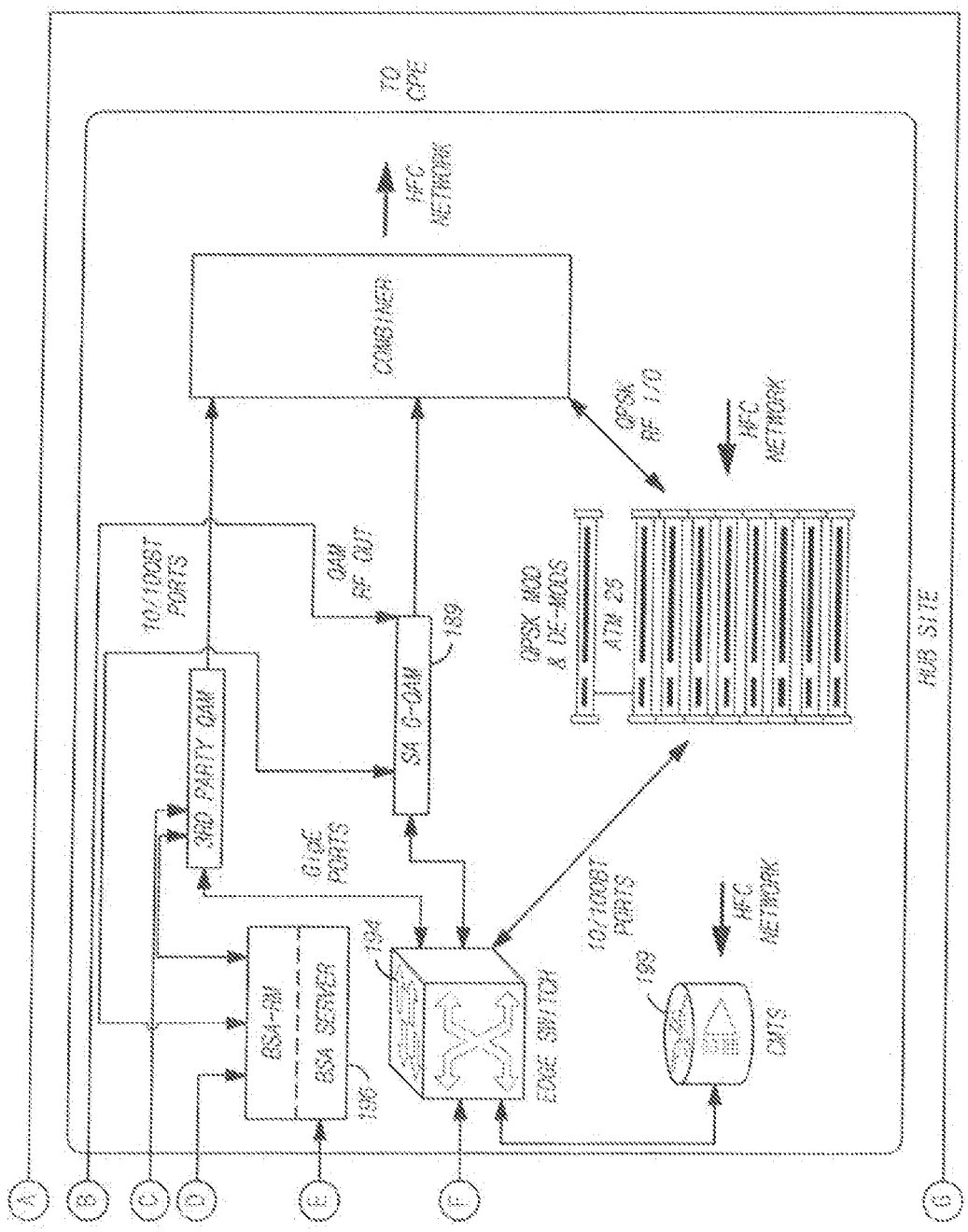
FIG. 1c is a functional block diagram illustrating one exemplary broadcast switched architecture (BSA) network useful with the present invention.

FIGS. 1b and 1c illustrate an exemplary "switched" network architecture useful with the present invention. While a so-called "broadcast switched architecture" or BSA network is illustrated in this exemplary embodiment, it will be recognized that the present invention is in no way limited to such architectures.

Switching architectures allow improved efficiency of bandwidth use for ordinary digital broadcast programs. Ideally, the subscriber will be unaware of any difference between programs delivered using a switched network and ordinary streaming broadcast delivery.

Specifically, as shown in FIG. 1b, the network 101 of FIGS. 1 and 1a comprises a fiber/coax arrangement wherein the output of the MEM 162 of FIG. 1a is transferred to the optical domain (such as via an optical transceiver 177 at the head-end or further downstream), The optical domain signals are then distributed to a fiber node 178, which further distributes the signals over a distribution network 180 to a plurality of local servicing nodes 182. This provides an effective 1:N expansion of the network at the local service end.

FIG. 1c shows the implementation details of one exemplary embodiment of this switched digital network architecture. Specifically, the head-end 150 contains switched broadcast control and media path functions 190, 192; these element cooperating to control and feed, respectively, downstream or edge switching devices 194 at the hub site which are used to selectively switch broadcast streams to various service groups. A BSA server 196 is also disposed at the hub site, and implements functions related to anticipatory switching and bandwidth conservation (in conjunction with a management entity 198 disposed at the head-end) as discussed subsequently herein. An optical transport ring 197 is utilized to distribute the dense wave-division multiplexed (DWDM) optical signals to each hub in an efficient fashion.

Co-owned U.S. patent application Ser. No. 09/956,688 filed Sep. 20, 2001 and entitled "Technique For Effectively Providing Program Material In A Cable Television System", issued as U.S. Pat. No. 8,713,623 on Apr. 29, 2014, incorporated herein by reference in its entirety, describes one exemplary switched digital architecture useful with the present invention, although it will be recognized by those of ordinary skill that other approaches and architectures may be substituted.

BSA programming may comprise, without limitation, simulcasts, interactive pay-per-view (IPPV), live sporting and other events, and other selected offerings. A set-top box (STB) or two-way Digital Cable Ready (e.g., CableCard) television is required for viewing.

In order for the BSA function to be transparent to the subscriber, channel change latencies must be kept to a minimum (e.g., 250 ms or less as compared to average linear digital broadcast services). Like video-on-demand (VOD) systems, BSA programs are streamed to a service group (contrast: switch) only when being viewed. Unlike VOD, many viewers can view the same stream. Typically, only real-time linear programs are included in BSA broadcasts. Since there is no storage involved, the "VCR" controls (e.g., trick mode functions) common to VOD are not available. In this regard, BSA is much simpler that VOD. Commercials or other programming segments cannot be skipped, and program bit rates can be treated as in more conventional systems.

In the context of the aforementioned BSA network, there are several metrics or indices which are useful in evaluating the performance of the network. Specifically, the expression "peak streams" represents the maximum number of different program streams that are instantaneously (based on specified data intervals) needed. Using software, peak stream requirements can be analyzed for each group size. It has been noted by the Assignee hereof that generally speaking, as service group size is decreased, peak stream needs also decrease. When viewed over a sufficiently short time scale (e.g., two hour periods), it is possible to compare the moment-to-moment variability in peak stream use. Note that the physical network topology (which determines service group size) can also be modified, and is expected to migrate towards smaller groups of subscribers over time.

It has also been noted that the smaller service groups display roughly the same variability as the larger service groups down to a certain threshold size. When considered as a percentage of maximum stream use, as service group size decreases beyond this threshold, variability increases, and will impose a limit the amount of concentration that can be safely implemented within the system. Concentration in the context of BSA networks is defined as a ratio of the total bandwidth of the programs offered, to the BSA bandwidth provided to the service group. While this is conveniently expressed as a ratio of stream counts, in practice streams will be of various bit rates; concentration is therefore best thought of as the ratio of the bitrates. Concentration generally (at a given grade of service or blocking frequency) trends upwards with decreasing service group size.

Another useful metric of the value of BSA is yield. Yield is a function of concentration and the total number of programs included. Yield is important to consider when comparing the value of various bandwidth reclamation techniques.

As verified by actual trials conducted by the Assignee hereof, BSA provides significant concentration, which results in the ability to vacate significant portions of the previously occupied bandwidth ("free" bandwidth yield).

Also of interest is the metric of "redundant viewership". Redundant viewers are those which view otherwise unique programs. Generally speaking, the highest number of redundant viewers occurs at prime-time or just post prime time. This is also the time of greatest total viewership and the time of highest peak stream needs. A design point of X streams would provide a non-blocking grade of service; however, however, significant surplus bandwidth still exists below the X-stream level. Unfortunately, the greatest surpluses occur at times when other services (e.g., VoD) also have their lowest demands. Edge QAM resource sharing with VoD is therefore not expected to provide significant interleaving bandwidth gains. However, the BSA system can be advantageously operated to allow this surplus bandwidth to be utilized in other ways, such as for transport of data, video, voice, or even future applications which would require additional bandwidth.

Gain is a useful parameter for comparison of BSA with statistical multiplexing technology. In BSA, percent gain is defined as:

$$(\text{Concentration} - 1) \times 100 \qquad \text{Eqn. (1)}$$

In this context, content that occupies the "freed up" spectrum is assumed to operate with the same level of efficiency as the content being processed (i.e. switched under the BSA architecture, or alternatively statistically multiplexed).

A primary advantage of the BSA paradigm is bandwidth conservation/preservation. Bandwidth for unviewed programs is not consumed, and can be re-allocated. Similarly, new programs can be added without adding bandwidth. Advantageously, programs with narrow appeal can be added in a BSA system with little if any bandwidth impact. More popular programs will impact the BSA bandwidth, but to a lesser extent than was traditionally the case. Multiple bit rates can also be made available for use or sale to programmers or advertisers.

BSA bandwidth efficiencies are at least in part a result of over-subscription. Specifically, the selection of programming is greater than the bandwidth allocated to the service group. This can result in blocking, the case where a viewer is denied access to a requested program. However, the aforementioned trials conducted by the Assignee hereof demonstrate that when properly configured, blocking events are sufficiently rare, so as to be less common than a network outage, thereby providing a sufficient level of service.

Additionally, a BSA system typically gathers and keep logs or other records of programmer-specific viewership data. For example, the BSA server gathers logs that are based on the client-server interactions. These logs or records are maintained to allow for well-considered "recapture" of non-viewed program streams (i.e., reclamation of bandwidth). The server manages bandwidth by removing streams based on this activity data. In typical practice, unviewed streams will be marked, but not actually removed until the bandwidth is needed either because of a client request, or based on external resource demands such as VOD overflow.

In one exemplary embodiment, the network manager (BSA manager 450; see FIG. 4) logs all channel change events and is aware of the tuning locations of all tuners, not just those that happen to be viewing BSA programs. This provides highly accurate and complete viewership data based on actual channel changes as contrasted with extrapolations or other estimation techniques.

It may be important for the MSO to maintain subscriber privacy, for both legal and commercial reasons. As discussed in greater detail subsequently herein, subscriber identities are optionally protected by hashing or encryption of the tuner address prior to logging and storage. The stored address and associated events are therefore not traceable to the user account. The resulting obscured tuner address is repeatable so the necessary tuning location and user activity tracking may be performed while still maintaining complete anonymity. Alternatively, all or portions of the user-specific (albeit anonymous) information may be stripped off before storage of the activity data within the historical database.

In the exemplary embodiment of the present invention, the edge switch 194 (generally located in the distribution hub as shown in FIG. 1c) is flooded with all available programs. This improves transport efficiency, because a simple unidirectional "drop and continue" protocol is performed at each hub location on a given optical transport ring 197. The concept of flooding also simplifies the transport network in that no control system is needed; rather a simple "deliver everything" paradigm is used. This approach also advantageously makes this portion of the signal chain more robust, since more complex control systems generally lend themselves to a higher operational failure rate.

Because ordinary broadcast programming is supplied using BSA, the transport network 197 needs to have a high degree of availability. In the exemplary embodiment, BSA program transport is supplied through a redundant, spatially diverse counter-rotating Ethernet ring topology, although other topologies may be utilized with success.

Predictive Resource Allocation Methods

Figure 2:
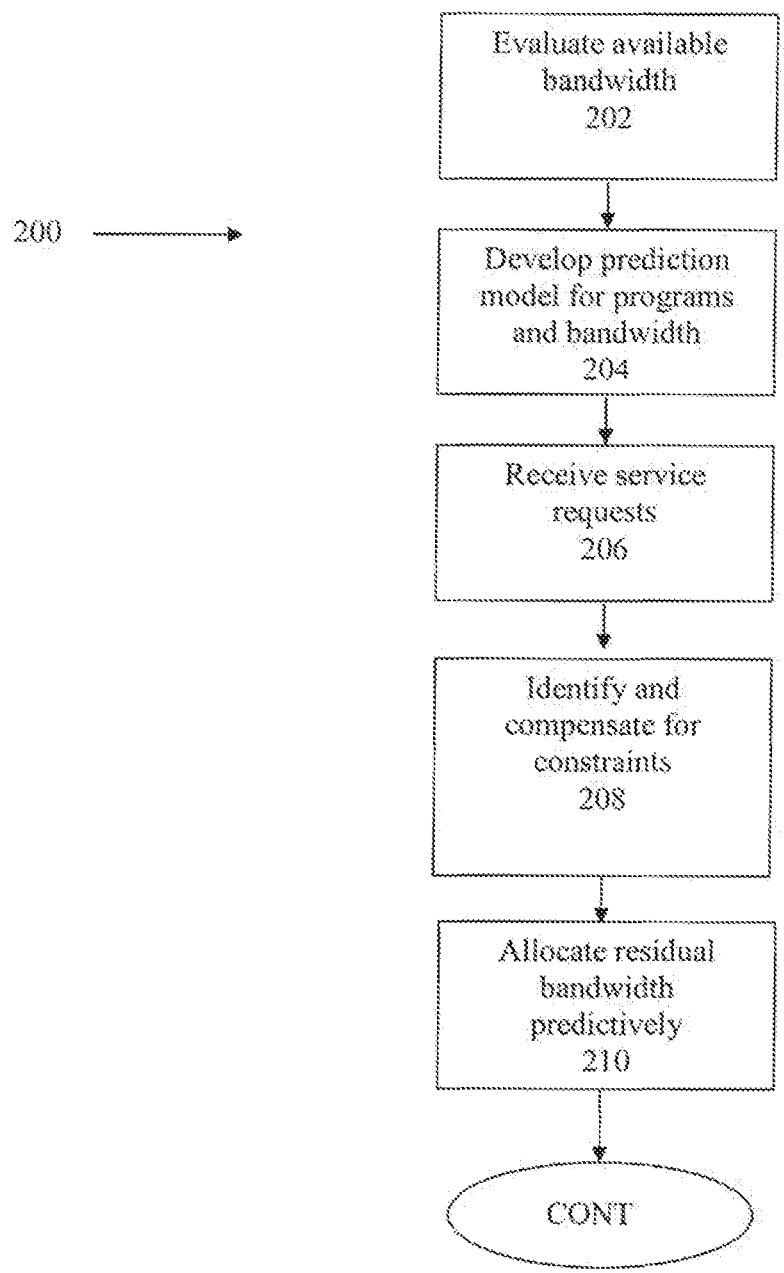
FIG. 2 is a logical flow diagram illustrating a generalized method of predictively evaluating and allocating program content according to the invention.

Referring now to FIG. 2, one exemplary embodiment of the generalized methodology of predictive resource allocation and content delivery is described. It will be appreciated that while the following methods are described in terms of bandwidth allocation, these methods may be used for allocation of other network resources as well with proper adaptation.

As shown in FIG. 2, the method 200 first comprises evaluating available bandwidth per step 202. This may comprise for example determining the current use of bandwidth within the network, and then subtracting that from the total network capacity.

Next, in step 204, a prediction or model of program and bandwidth usage (based on constituent programs) is developed.

Per step 206, the relevant process (e.g., server process 452 described subsequently herein) or its proxy receives requests from network users for the modeled content (programs).

Per step 208, any bandwidth constraints present are identified and compensated for. For example, identification of constraints might comprise simply determining the aggregate bandwidth required to service all of the individual requests as a function of time, and comparing this to available bandwidth during those same times to identify potential shortfalls. Compensation for any identified shortfalls might include e.g., removing redundant or high-bandwidth versions of one or more programs, or migrating certain subscribers to lower-bandwidth versions of the same content ("defragmentation" of subscribers, of sorts), as described in greater detail below.

Lastly, per step 210, remaining bandwidth is identified, and one or more programs predictively inserted according to the model of step 204.

Referring now to FIG. 2a, one exemplary embodiment of the generalized method of FIG. 2 is described.

In the embodiment depicted by FIG. 2a, at step 222, a server process determines the currently available bandwidth (for instance, by the process described in co-assigned U.S. patent application Ser. No. 11/243,720, filed Oct. 4, 2005, entitled "SELF-MONITORING AND OPTIMIZING NETWORK APPARATUS AND METHODS", issued as U.S. Pat. No. 8,582,584 on Nov. 12, 2013, and incorporated by reference herein in its entirety) and also predicts future unused bandwidth (for instance, the methods described in co-assigned U.S. patent application Ser. No. 11/800,093 filed May 4, 2007, entitled "METHODS AND APPARATUS FOR PREDICTIVE CAPACITY ALLOCATION", issued as U.S. Pat. No. 9,398,346 on Jul. 19, 2016, which is also incorporated by reference in its entirety).

Optionally, at step 224, the server process may determine the programs that are not currently being requested (for instance, by using the methods described in application Ser. No. 11/243,720 discussed above).

Figure 3:
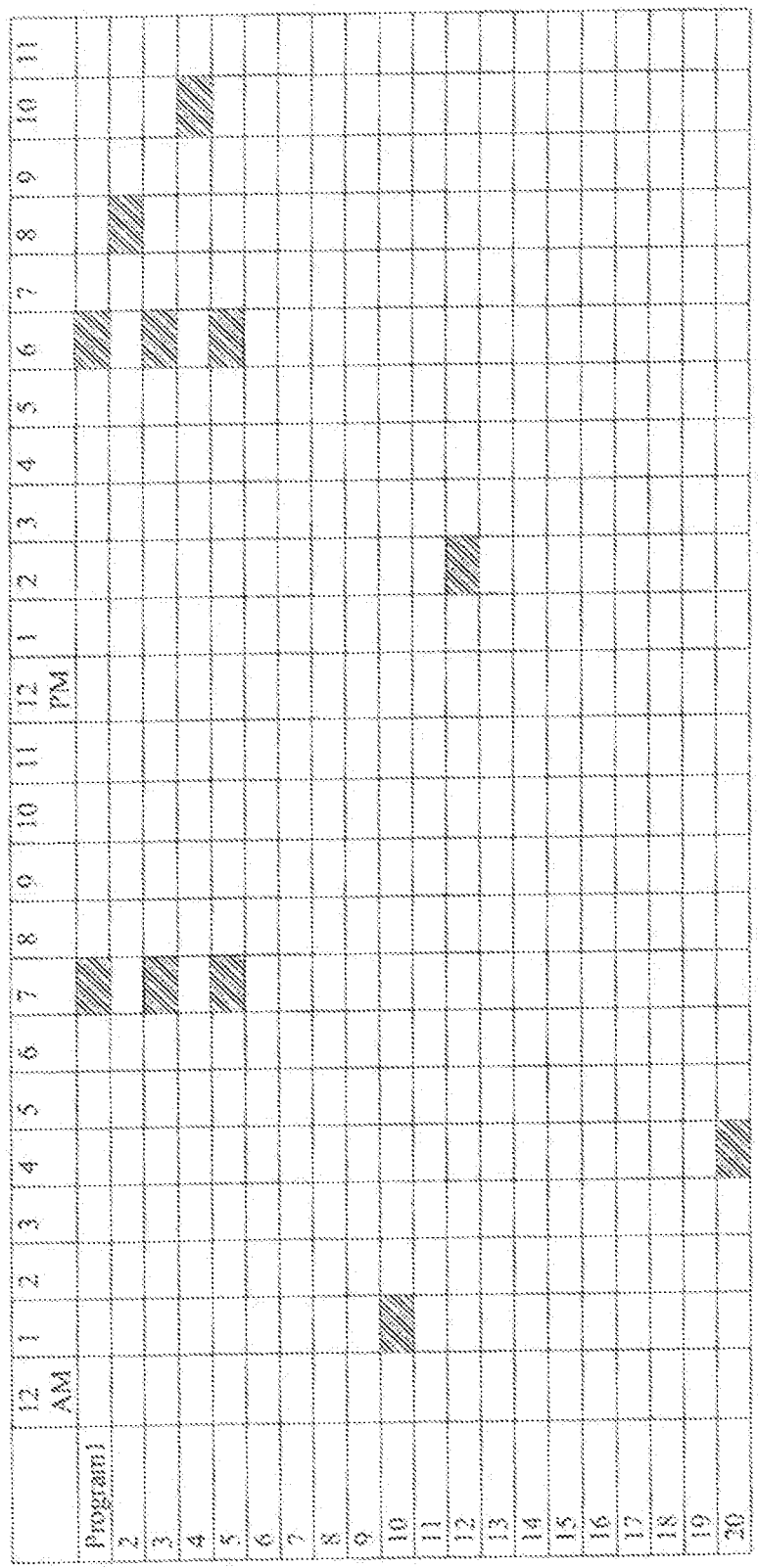
FIG. 3 is graphical representation of an exemplary viewing grid illustrating time-of-day versus program selected.

At step 226, the server process accesses compiled historical information (see, e.g., aforementioned application Ser. No. 11/243,720). In some embodiments, this information comprises a table that cross-references time-of-day or other chronological reference with the program channel(s) requested. In other embodiments, this information comprises a table that cross-references time-of-day, etc. with the program(s) requested, as illustrated in FIG. 3. Other reference or relational schemes may be used as well. Note that although FIG. 3 appears much like a TV viewing grid, the darkened cells represent programs that were actually requested, not merely available to be requested (i.e., an undarkened cell indicates that a particular program was available at a certain time but was not requested by anyone). It should also be noted that FIG. 3 may not be representative of an actual scenario insofar as it indicates that very few programs were actually requested over the indicated time period. In general, it is expected that viewing will be sparse during the middle of the night, higher in the morning, moderate during the daytime, and highest in the evening, although current events, holidays, etc can affect this generalization significantly. Accordingly, different viewing versus time templates or profiles may also be created an implemented consistent with the invention; e.g., "weekday template"; "Christmas template", "election day template", and so forth. Such templates can be substituted for actual analysis if it is believed that they will comprise an accurate representation of actual viewer behavior in the prior in question.

Although the cells in FIG. 3 represent one-hour increments, such one-hour increments are shown mainly for illustrative purposes. The actual required time resolution may be determined according to experience, or even varied (expanded, contracted, tied to another event, etc.) situationally. Thus, the record of requested channels and/or programs may be delimited by myriad other time resolutions (or combinations thereof), for example, fifteen minutes or less for conventional program channels, or two minutes for on-demand programming, and so forth.

Continuing per step 226, upon using the historical information and the information concerning channels or programs which are not currently in use, the server process 452 generates a table or other data structure that cross-references time-of-day with the channels and/or programs predicted to be viewed. Such a table may be organized in a manner similar to FIG. 3, except the generated table represents predictions of which channels/programs will likely be requested during a timeslot, instead of the channels/programs that were actually requested for a historical period.

It will be appreciated that the predictions associated with the aforementioned table or other data structure may also have other data associated with them that may be useful for a variety of purposes. For example, one variant of the invention uses the aforementioned server process 452 to also generate, where sufficient information is available, a confidence rating or probability relating to the estimated accuracy of the prediction. For example, where the predicted behavior is based on one piece of historical data, the confidence might be significantly lower than if the prediction was based on numerous data points (e.g., data from many days at that same time, etc.). As another alternative, a statistical variance ($\sigma^2$) or standard deviation ($\sigma$) may be calculated for past predictions (i.e., how well, historically speaking, have the server processes' predictions correlated with actual user behavior for the prediction of interest), and the results used to generate a probability or confidence metric. As yet another alternative, statistics can be generated for how well all or a subset of such predictions (as a whole) have correlated to actual behavior.

Ranges of the resulting confidence/probability metrics can be assigned to various actions as well. For example, one rule might state that any confidence values below 25% (0-100% scale) will be discarded and not used for further processing, or alternatively will cause the server process 452 to return and look for more historical data to analyze relating to the particular time slot/event/program of interest, thereby attempting to "force" the confidence in the prediction to an acceptable level.

It will also be appreciated that such confidence/probability values or metrics need not be deterministic or based on linear variables. For example, in one alternative approach, the results are converted into a fuzzy logic domain (e.g., "high", "medium", "low", or the like) and rendered in a human-readable form (e.g., XML metadata) so that, inter alia, they are also meaningful to and readily appreciated by humans. A person can e.g., obtain a printout of the table or other data structure and immediately see where the high confidence predictions lie. A multidimensional "contour" plot may also be generated if desired for a yet more intuitive display. Human inductive reasoning ("pattern recognition") can be a very effective tool in this regard; i.e., identifying regions of the plot with high confidence, and as a result selectively focusing the server process Myriad other approaches to ancillary or related data processing and generation will be recognized by those of ordinary skill in the arts provided the present disclosure.

Information concerning channels/programs not currently in use may be used by the server process in deciding, for example, to override or adjust predictions generated by the historical information. For example, the historical information may indicate that a certain program has typically been requested at the current time of day. However, the server process may have identified that this program has not been requested for some time and has not currently been requested. Alternatively, the server process may determine that the aforementioned program is topically inapplicable to this particular time slot (e.g., the Super Bowl has always been slotted for this period in past years, but this year the NFL has moved the game to another day or time slot). Therefore, the server process may decide to override or modify the indication from the historical information that that program will be requested in the to-be-predicted time interval, and instead, decide that it will not be requested in the to-be-predicted time interval. Herein lies a significant facet of the exemplary process of the present invention; the aforementioned table or other data structure may be based on either "positive" data (i.e., what it is predicted that people will be requesting), "negative" data (i.e., what it is predicted that people will not be requesting), or even combinations thereof. Such combinations may be for example either (i) inter-prediction (i.e., one prediction for a first time slot being based on positive data, and another prediction for a second different time slot being based on negative data), or (ii) intra-prediction (i.e., one prediction for a first time slot being based on both positive data and negative data, effectively indicating "we have an idea what it might be, and we know definitely what it will not be").

In another example, suppose that after historical information is analyzed, a prediction is made that a certain program will likely be requested at a certain time. It is then discovered that the program is a one-hour program that began a half an hour ago—thus, when the program began, it was not requested, and the program currently is still not being requested. In general, it is known that with this particular program, if a viewer has not requested it in the first half-hour, it is unlikely that the viewer will request it in the second half-hour. In these situations, the server process may decide against making that program available in the next half-hour, as it is unlikely to be requested according to this rule. Put differently, in certain situations, more relevant historical data (e.g., recent program viewing history) may be given more weight than less relevant data (e.g., "ancient history") in deciding which content should be made available.

Similarly, suppose the server process determines that a program has been requested and has been in use for some time. The server process may decide to continue to continue to providing this program to subscribers, even when historical information indicates that this program should not be in demand at the current time.

Note that as previously noted, in various embodiments of the invention, the prediction model may be updated by comparing programs currently in use to those which are predicted to be in use. One example of this is altering the range that historical data is taken into account. This could occur, for instance, when the server process determines that certain "outages" (times when programming is not available to some percentage of subscribers) have exceeded an acceptable threshold (e.g., in hours per year). In these situations, the server process may in one embodiment analyze the historical data record (where it is assumed that the historical record contains both actual and predicted program usage data) to find a better interval over which to consider the historical data. In one variant, an algorithm that calculates a certain outage (or blocking) probability for various intervals of time until an appropriate interval is identified is utilized by the server process; this approach can be used to inter alia achieve a desired outage probability. Subsequent predictions of demand for the program or programs associated with that historical data may then use this interval. Adjustments to the interval may subsequently be made. Those skilled in the art of statistical prediction will be able to derive and implement the foregoing algorithm, as well as myriad other ways to adjust the prediction model over time consistent with the invention when provided the present disclosure.

According to other embodiments, various ad hoc or anecdotal adjustments may also be employed (e.g., adjustments based on service operator observations). For example, in certain instances, operators may notice that a program has become popular "lately," or popular as of a certain date. In other instances, a new program scheduled to commence on a certain date may be expected to attract large viewership from the outset. Thus, after an adjustment is implemented, the historical data is analyzed from these respective dates. This is advantageous because predictions made using older intervals are often likely to be less accurate than predictions made using more recent intervals.

Analysis of historical viewership data may also be used to uncover helpful periodicities in the data. Seasonal variations in historical viewership data may be revealed from the analysis and used to accurately predict future requests for that programming. For example, summer viewing patterns may be quite different from winter viewing patterns; historical viewership data input to the prediction algorithm of the server process 452 may thus be separate for each season.

As another example, analysis of historical data may reveal that programming requests for a given Thursday evening may be more accurately predicted by employing historical data from an equivalent Thursday one year ago as opposed to the Thursday of last week, or a recent set of prior Thursdays. This could occur if, for example, it is discovered that certain days of the year (e.g., Super Bowl Sunday, New Years Eve, Labor Day, etc.) exhibit predictable viewing patterns which are best measured from the patterns exhibited during the same day from prior years.

As described in co-assigned U.S. patent application Ser. No. 11/243,720, filed Oct. 4, 2005, entitled "Self-monitoring and Optimizing Network Apparatus and Methods", issued as U.S. Pat. No. 8,582,584 on Nov. 12, 2013, previously incorporated herein, in some embodiments, the server process 452 may know the viewing history (possibly including current program(s) being viewed) of the user terminals. This knowledge may be provided to the server process by service provider operator input, from data obtained directly from the delivery network, and/or by the server process polling the user terminals to determine their viewing status. With this knowledge, the server process 452 will predict that at a certain time bandwidth may be freed up for reallocation. For instance, suppose the server process predicts that at a certain time the viewers of a certain channel within a certain service group will cease viewing that channel. The server process may then remove that program channel from service at the appropriate time and allocate the released bandwidth to another program. Conversely, if the server process predicts that user terminals may come online at a certain time, it will predictively add programs to the service group when those programs are expected to be requested.

Referring again to FIG. 2a, at step 228, the server process configures the system (for example using methods described in co-assigned application Ser. No. 11/243,720, entitled "Self-monitoring and Optimizing Network Apparatus and Methods,") to deliver the designated content based upon the table of program channels predicted to be in demand and based upon the currently available bandwidth. In one variant, this comprises as many programs as will fill the available bandwidth. In other variants, this comprises as many programs as will fill a portion of the available bandwidth, thus setting aside or reserving portions of the bandwidth for other related services.

At step 230, the server process determines whether the bandwidth requirements of the requested programs exceed the capacity of the available current bandwidth, or vice versa. Both possibilities of this decision are discussed in detail below.

In the event that the available bandwidth capacity exceeds the sum of the bandwidth requirements of the requested programs, the server process at step 232 removes lower quality versions of programs, and at step 234, delivers higher quality versions of these same programs. Note that the decision to replace lower quality programs with higher quality programs may depend upon whether the subscribers who are currently viewing the lower quality programs have CPEs capable of processing the higher quality versions of the programs. For example, to change a current stream from an SD video stream to its HD version, it may be necessary that all CPEs currently receiving that SD stream are capable of processing the HD version of that stream. This processing may include carrying the HD resolution through the CPE and providing an HD resolution output capable of driving an HD display device. Alternatively, this processing may include downconverting the HD resolution to SD resolution and providing an SD resolution output to drive an SD display.

Some variants on this comprise utilizing all or part of the excess bandwidth to provide "extra services," as described in co-assigned U.S. patent application Ser. No. 11/800,093 entitled "METHODS AND APPARATUS FOR PREDICTIVE CAPACITY ALLOCATION, issued as U.S. Pat. No. 9,398,346 on Jul. 19, 2016, (previously mentioned and incorporated by reference). In one of these variants, the server process bases its decision of whether to replace lower quality programming with higher quality programming and/or extra services upon whether the current bandwidth surplus is expected to persist for a certain period of time (or meet other designated criteria, such as not exceeding a certain level of bandwidth variability for a period of time). This is accomplished by projecting the bandwidth required for a particular broadcast some time into the future. Thus, the server process uses the historical information to predict whether there is sufficient bandwidth to accommodate a higher quality program, and whether that bandwidth is likely to persist for all or most of a target broadcast period. This is advantageous because it is often undesirable to change from higher to lower quality and vice versa frequently during the actual broadcast of a program in that reduced subscriber satisfaction may result from perceived changes in video quality or even short interruptions during the switchover (discontinuities).

In the event that the sum of the bandwidth requirements of the requested programs exceeds the currently available bandwidth, as per step 236, the server process restricts the availability of high bandwidth programs. This can be accomplished in a variety of ways—for instance, by removing the high quality programs from the broadcast stream, or alternatively, by replacing high quality programs with their lower quality equivalents, as per step 238. For instance, quality differences may result from differences in compression or encoding (e.g., HD versus SD, MPEG2 versus MPEG4, etc.). Thus, if certain subscribers are currently requesting HD program streams, but the server process has predicted that the required bandwidth will soon exceed the available current bandwidth, then the server may schedule a switchover of one or more of those users to a version of the program broadcast in SD (or a compression scheme utilizing a different bit rate) during the time that the required bandwidth is predicted to exceed the available bandwidth. For example, a transcoded or transrated version of the desired content may be supplied. Exemplary methods and apparatus for transcoding/transrating are described in co-owned U.S. patent application Ser. No. 11/726,095 filed Mar. 20, 2007 and entitled "METHOD AND APPARATUS FOR CONTENT DELIVERY AND REPLACEMENT IN A NETWORK", which is incorporated herein by reference in its entirety, although other approaches may be used with equal success consistent with the present invention.

Note also that the number of subscribers scheduled to be switched over to SD versions of a particular program may be determined according to the difference between the total predicted input bit rate requirement and total output bit rate capability (e.g., if a shortfall of 24 Mbps in output bit rate availability is predicted, then the server process 452 may reconfigure the system to switch 2 users from 19 Mbps HD streams to 7 Mbps SD streams carrying the same programming content). The decision to switch a program from HD to SD may depend on whether some or all of the CPEs currently receiving that program are capable of upconverting from SD to HD resolution. Upconverting may include, for instance, increasing the number if pixels in a video image by resampling that image, followed by sharpening the edges of objects within that image. These and other upconversion techniques are well known to those of ordinary skill in the art.

As mentioned previously, the server process may also be adapted to identify the capabilities of individual CPE. According to these embodiments, the server process uses knowledge of CPE capabilities to determine which versions of programs to convey to the CPE. For example, the server process may receive capability data indicating the presence of certain CPE which are only capable of ingesting video data at a certain bit rate (for example, portable devices). This bit rate may be substantially lower than the maximum bit rate at which a set top box (STB) CPE is able to ingest video data. Thus, the server process 452 will determine the content provided to the CPEs based upon this capability data.

The capability data may be transferred to the server process at different times according to various embodiments. For example, according to one embodiment, a CPE provides its capabilities to the server process as part of the system initialization procedure (for example, immediately after the CPE is powered up, or new software installed). According to other embodiments, a CPE waits for a user action (such as a button push on the remote control) before sending data describing its capabilities to the server process. This is useful, for example, in avoiding those situations where all CPEs in a subnetwork attempt to send data describing their capabilities to the server process simultaneously (such as immediately after a power outage).

In yet another embodiment, the CPE issues its relevant specifications as part of a "capabilities" or other message sent from the CPE in response to a ping or downstream communication (e.g., from the server process).

In yet a further embodiment, the various CPE in the network can be scheduled into a multiple access scheme e.g., TDMA, randomized, CSMA/CD, FDMA etc.) so as to avoid or at least mitigate the aforementioned upstream "flood" of capabilities messages.

In some variants, the server process receives the decoding capabilities of the CPEs in the service group. With this knowledge, the server process predicts which times bandwidth can be freed up for reallocation. For example, suppose the server process predictively determines that at a certain time all viewers of a certain channel whose terminals have only MPEG2 decoding capability will cease viewing that program channel. The server process may then switch the input of that program channel from its MPEG2 version to its MPEG4 AVC version, possibly achieving a 50% reduction in the bandwidth required to deliver that content, but with no loss in perceived quality. Conversely, the server process may predict that user terminals with only MPEG2 capability may come online at a certain time, and thus switch from the MPEG4 AVC version of a program to its MPEG2 version in order to support those MPEG2 terminals.

In some variants, the server process may know the display capabilities of the user terminals, and use this knowledge to predictively provide programs at a lower or higher bit rates, compressed using the same encoding standard. Thus, if the server process predicts that at a certain time a number of portable devices will begin viewing a certain program, the server process may switch the set of user terminals from receiving a version of a program encoded using MPEG4 AVC at 2 Mb/s to receiving a version encoded using MPEG4 AVC at 200 kb/s.

In other variants, the server process 452 may know the storage capabilities of the CPEs and use this knowledge to predictively provide programs at a lower or higher bit rates, depending upon those capabilities. For example, a CPE with storage capability may be able to ingest programs at a bit rate much lower than the bit rate which would be used for streaming programs to that CPE in real time. That CPE may then replay programs ingested at low bit rates at higher bit rates for purposes of real time display of those programs. Alternatively, programs may be ingested by the CPE at bit rates higher than bit rates required for real-time display of those programs, allowing transient periods of higher bandwidth availability to be used to provide content. In a third set of variants, the CPE may transfer one or more of programs to other devices at bit rates either above or below real time display bit rates.

In addition to those already described, the present invention affords other benefits as well. Specifically, in one aspect, the switching latency previously described herein (e.g., that associated with switched architecture networks) is significantly reduced by implementing the server process 452 of the present invention, since (i) the CPE can use a local channel map versus one maintained by the switching hub or other network entity, and (ii) in many cases, no server switching operation at the hub is required (i.e., the requested program is already being predictively delivered; it is just not presently tuned to by the CPE). The CPE need merely tune to the correct QAM where the (predictively) delivered and now requested content is streaming, and recover that stream.

Figure 2B:
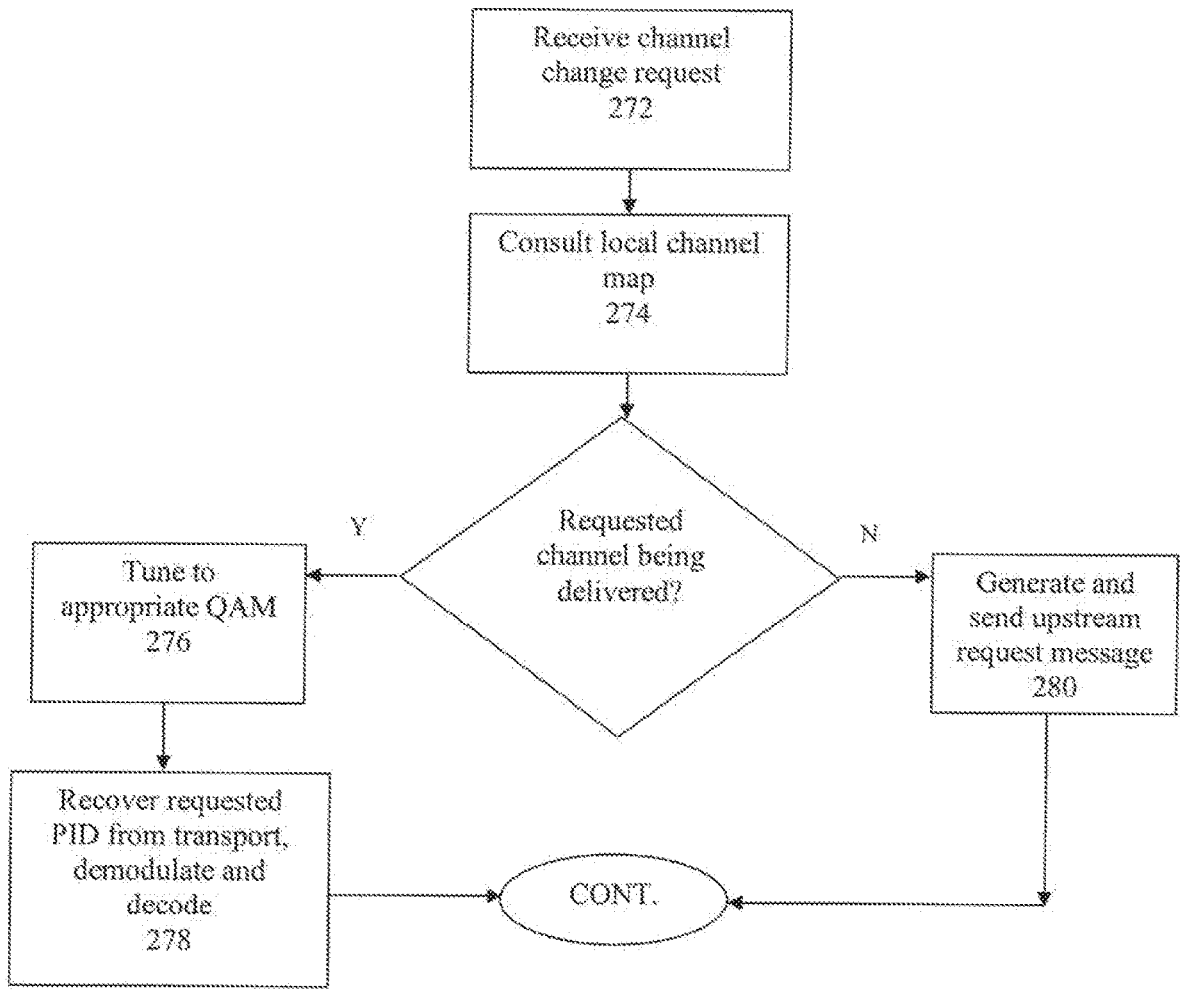
FIG. 2b is a logical flow diagram illustrating one embodiment of the method of processing a channel change request according to the invention.

Another benefit provided by the invention is the reduction in service calls (e.g., "truck rolls" and the like) needed based on non-responsive CPE. As previously discussed, a certain percentage of CPE within the subscriber will at any given time be "non-responsive" due to their inability to communicate with upstream entities. The non-responsive devices may also change with time, but in number and identity. Advantageously, the present invention affords a mechanism by which non-responsive CPE can receive newly requested program streams that were otherwise not being viewed by any subscribers. Specifically, one embodiment of the invention uses a portion of the available downstream bandwidth to deliver program streams that are being requested at that time (i.e., that one or more subscribers are tuned to), and the remaining bandwidth or at least portions thereof to predictively deliver program streams that are not being requested or viewed at that time. As shown in FIG. 2b, when a subscriber inserts a channel change request to a program stream (step 272), the CPE logic first consults the local channel map (step 274) to determine if that program stream is present on one of the current QAMs. If so, then a signal is sent to the tuner resource of the CPE 106 per step 276 to tune to the appropriate QAM, which is then recovered from the QAM transport multiplex using the program PID, and demodulated/decoded (step 278).

Alternatively, if the requested program stream is not present on any current QAM, then an upstream message is generated and sent from the CPE per step 280 to the switch process (e.g., BSA server) to switch in the requested program stream, and generate an updated channel map. Clearly, in the case of a non-responding CPE 106, this last sequence of sending an upstream message cannot occur, and hence the subscriber's channel change request will be effectively ignored unless the requested stream is on an existing QAM. By predictively and "intelligently" delivering unrequested programs via unused bandwidth using the server process 452 of the present invention, the likelihood that a subscriber's request can be serviced, even when the CPE is non-responsive, increases significantly. Specifically, since this technique is predictive, the channel is added in advance, so the CPE 106 is requesting a channel that has been predictively added. The tuning information needed by the CPE to tune the channel can be obtained by for instance the CPE reading the mini-carousel stream that is already present, which means that a reverse communication channel is not required.

Clearly, since the predictions generated by the server process 452 are likely to never be completely accurate, there will be some cases where the requested program is not being predictively delivered. In this case, the BSA network operates effectively as it would under normal circumstances. However, if the predictions generated by the server process are even modestly accurate, benefits in terms of reduced latency and continued use of "non-responding" devices are realized.

It will also be appreciated that while the foregoing embodiments of the invention are described in the context of a predictive model one where a prediction is generated based on inter alia historical information of relevance), the invention may also be used consistent with a speculative model, such as where speculative decisions on program insertion are made according to non-historical analysis. For instance, a non-requested program stream might be selected for insertion based on its topical correlation to other content requested, or delivery according to a predetermined relationship or temporal order (e.g., "ensemble" delivery). Alternatively, a statistical algorithm might be imposed, so that each program is at least statistically picked for insertion at a prescribed frequency (independent of any historical demand analysis). As yet another option, a randomized approach may be employed. Myriad other speculative approaches may be used consistent with the invention, whether alone or in conjunction with the predictive approaches previously described.

In addition to predictive or speculative insertion or scheduling of different program streams as previously described, the exemplary server process 452 is also configured to perform periodic or ongoing evaluation of programs that are being delivered in order to determine if deletion (removal) is appropriate. Specifically, in one variant, the server process determines the programs that have been requested, and which have been in use for a prescribed period of time, for the purpose of determining whether to continue their delivery, even when historical information indicates that such programs should not be in demand at the current time. Hence, reclamation or deletion decisions are tempered with real-time data relating to the actual use of a given program stream. For instance, if the predictive model indicates that Program X should not be requested at a given point in time, and the duration of one or more viewing events of Program X during that time are very short (e.g., a few seconds or less), it might be concluded that these viewing events were merely transitory, such as channel-hopping across this channel or inadvertent selection by a viewer. Accordingly, the server process 452 might select Program X for reclamation on the likelihood that it will not be selected again. Alternatively, if the viewing time of Program X is substantial and/or repeated then it can be surmised that for whatever reason, the historically-based predictive model is wrong.

The server process 452 may also be configured to use historical or other information (such as e.g., network operational or maintenance updates, etc.) to predict whether there will be sufficient bandwidth to accommodate transmission of a higher quality version of a program based on whether such bandwidth is likely persist for all or most of the target broadcast period. These determinations are useful for reducing the amount of switching from SD to HD (and vice versa) during the middle of broadcasts, which is undesirable since the user might be able to perceive the switching transient or reduction in visual quality. As previously referenced, the server process 452 determines the currently available bandwidth using for instance the process described in co-assigned U.S. patent application Ser. No. 11/800,093 entitled "METHODS AND APPARATUS FOR PREDICTIVE CAPACITY ALLOCATION", issued as U.S. Pat. No. 9,398, 346 on Jul. 19, 2016, previously incorporated herein, although other approaches may be used as well.

Another benefit of the approach of the present invention relates to unloading the switch/server during large transients or unplanned events (and recovery therefrom). Specifically, switched systems have a finite binding rate; i.e., rate at which streams can be added or bound to multiplex transports on a given QAM. For instance, if a service outage occurs, recovery from the outage will almost necessarily create a condition where the switch is flooded with requests for new streams, the addition of which are limited by the aforementioned finite binding rate. By implementing the techniques of the present invention, such large transients are effectively "smoothed out", since predictive delivery of at least some of the streams that would be requested during such a recovery will already be bound to the QAM(s), and hence the requesting subscriber's CPE 106 need only search its local channel map and tune to the appropriate QAM. (versus generating an upstream communication causing the switch to respond). Fewer upstream communications will also be needed, and hence "log-jams" of switching requests will be significantly mitigated during such periods.

Software Architecture and Associated Methods

Figure 4:
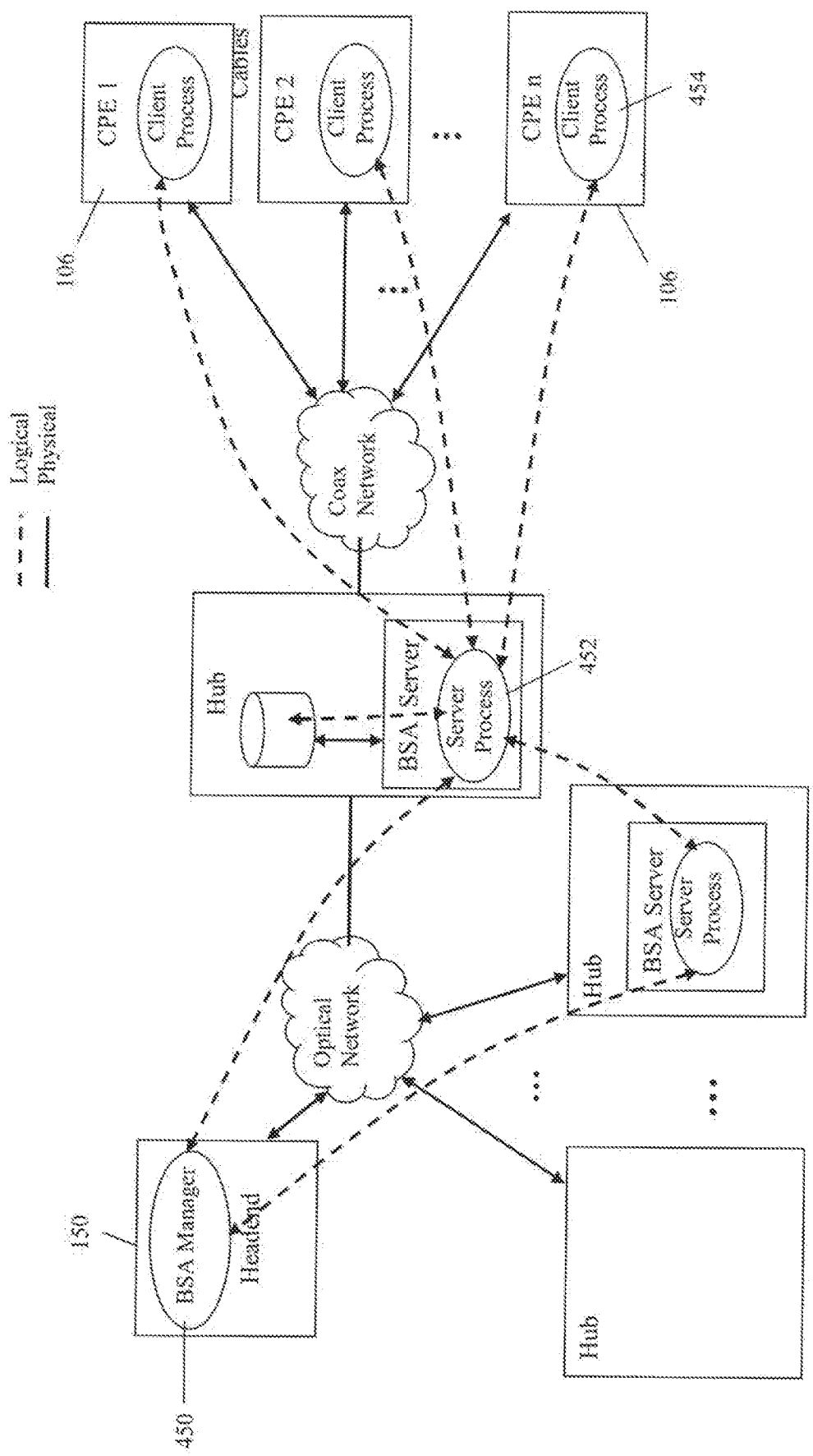
FIG. 4 is a block diagram illustrating one exemplary network topology and software architecture according to the present invention.

FIG. 4 is a block diagram illustrating one exemplary BSA network topology and associated software that can be used in conjunction with the present invention. While shown in the context of a BSA network of the type previously described with respect to FIG. 1c herein, it will be recognized that the server process and in fact other aspects of the invention may be used with equal success with other types of networks, including without limitation session-based VOD delivery networks.

As shown in FIG. 4, a cable headend 150 supplies cable content to one or more cable hubs 410. In turn, each of these cable hubs 410 supplies content to a plurality of CPEs 106 residing in an associated subnetwork.

As mentioned earlier, in standard BSA, only a subset of available programming is provided to each CPE 106 in order to preserve bandwidth. As such, unrequested channels are typically not included within the provided subset. However, in cases where content from these channels is subsequently requested by a subscriber, these channels are switched back on. In a similar manner, channels which are no longer requested by subscribers are switched off.

In accordance with various embodiments, a server process 452 resides within one or more nodes upstream from the CPEs 106. In one variant, a server process 452 is resident within a cable headend 150. In other variants, such as the one depicted in FIG. 4, a server process 452 resides in one or more cable hubs 410. In still other variants, a server process 452 resides both in one or more cable hubs 410 and the cable headend 150.

Also shown in FIG. 4 is an optional BSA manager process 450 is utilized at the headend 150. This process, inter alia, coordinates activity among the various different hub server processes 452, and provides an interface with other headend processes that may be required (e.g., provisioning, billing, etc.). The headend BSA process 450 may also optionally comprise a portion of a distributed application (DA), wherein processing necessary to support the functions of the server process 452 described herein such as prediction generation, historical data analysis, trend or statistical analysis, etc. may be performed at the headend 150 and delivered to the server process 452 at the hub (or vice versa), so as to either pre-process content for e.g., reduced latency, or off-load processing overhead to one software process or the other.

Each server process 452 receives data from one or more CPE 106, and subsequently determines the appropriate content to transmit to the CPE 106 based upon this data. This is best illustrated by the sequence diagram of FIG. 5 discussed below.

Figure 5:
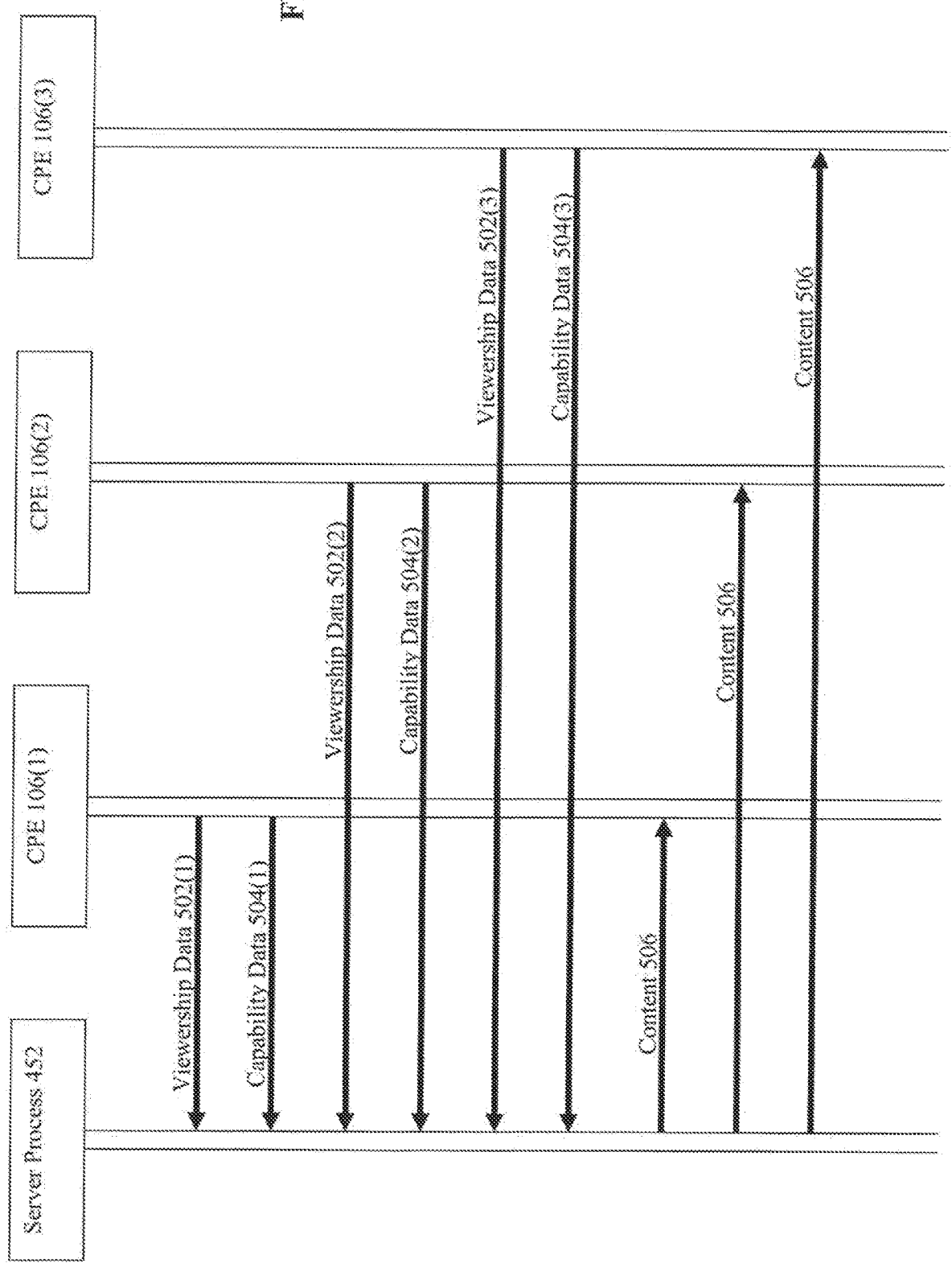
FIG. 5 is a sequence diagram illustrating an exemplary communication sequence between a server process and the CPE of an associated subnetwork.

In FIG. 5, the server process 452 receives viewership data 502 from one or more CPE 106. According to one embodiment, the viewership data 502 comprises the programs watched at various times throughout the day. According to other embodiments, the viewership data 502 comprises the channels watched at various times of the day. Other types of data (e.g., CPE power status, software versions installed, etc.) useful to the server process 452 may also be delivered. Any number of data structures may be used to organize this data in accordance with the scope of the present invention. Thus, tables, graphs, trees, lists, records, or myriad other data structures or combinations thereof may be used for this purpose.

Optionally, as according to certain embodiments, the capability data 504 of each CPE 106 may also be received at the server process 452. Generally, this capability data 504 comprises various characteristics of the CPE 106—for example, the data 504 may comprise the tuner, demodulation, encryption/security, display, storage, transmission, network, and decoding capabilities of a given CPE 106, including e.g., whether the CPE has HD or SD/HD upconversion capabilities.

Note that these capabilities may also include any number of factors, measurements, or specifications. For instance, display capabilities may comprise the video resolutions and bit rates supported by a given CPE 106. Decoding capabilities may comprise the codecs currently installed on a given CPE 106. Storage capabilities may comprise the capacity of a given CPE 106 to store data, etc., such as on an HDD.

Data relating to the security environment (e.g., trusted or authorized service domain, secure microprocessor (SM), etc.) of the CPE 106 or other connected devices may also be provided. See, e.g., co-owned U.S. patent application Ser. No. 11/584,208 filed Oct. 20, 2006 and entitled "DOWNLOADABLE SECURITY AND PROTECTION METHODS AND APPARATUS", issued as U.S. Pat. No. 8,520, 850 on Aug. 27, 2013, which is incorporated herein by reference in its entirety, which describes exemplary downloadable security apparatus and methods, and data relating thereto.

Just as with the viewership data 502, any data structure may be used to organize the capability data 504 in accordance with the scope of the present invention (including tables, graphs, trees, records, lists, and combinations thereof). According to one embodiment, the capability data 504 comprises a code, serial number, and/or model number of a CPE 106. The server process 452 is responsible for deriving the capabilities of the CPE 106 based on this code or serial/model number. This is implemented, for example, by referencing the model number to a table containing the capabilities of each CPE model 106. Advantageously, this allows for most of the capability information to be stored remotely from the CPEs 106.

Note also that in FIG. 5, the viewership data 502 for each CPE 106 is received before the capability data 504. This ordering, however, is not strictly necessary. In some embodiments, the capability data 504 is received before the viewership data 502. In other embodiments, the viewership data 502 and the capability data 504 are transmitted to the server process 452 as a single stream or ensemble of data. Thus, the ordering of when certain data is transferred can be adjusted in myriad different ways according to the desired implementation.

Once the viewership data 502 (and optionally, the capability data 504) for each CPE 106 has been received at the server process 452, the server process then determines the appropriate content 506 to be broadcast to the associated subnetwork. According to one embodiment, this is accomplished by aggregating the viewership data 502 together, identifying patterns in this aggregated data, and then deciding the content 506 to broadcast based upon these patterns. According to other embodiments, this is accomplished by identifying those programs which have not been requested by any CPE 106 over a certain measured interval and removing such programs from the provided content stream 506.

In the embodiments where capability data 504 has been transmitted to the server process 452, the capability data 504 may be used to determine, for example, the optimal compression scheme for a given program, or optimal broadcast quality. For example, the server process 452 may decide to replace a low-definition version of a program with a high-definition version of the same program if all CPE 106 in the associated subnetwork have the capability to support a high definition broadcast. In another instance, where users with CPE 106 supporting only MPEG2 broadcasts have currently tuned to a channel currently being broadcast in MPEG4, the server process 452 may decide it needs to replace the MPEG4 encoded program with an MPEG2 equivalent. As yet another option, migration of certain CPE from one QAM to another (e.g., from one version of a program being delivered in a first format to another version of the same program in another format) may be performed based on the data. Note that decisions based upon capability data are also based upon available bandwidth according to many embodiments of the invention.

The present invention may accordingly be configured to support predictive forced delivery of a certain type of copy of a program, as described e.g., in co-assigned U.S. patent application Ser. No. 11/881,034 entitled "METHODS AND APPARATUS FOR FORMAT SELECTION FOR NETWORK OPTIMIZATION" filed Jul. 24, 2007, issued as U.S. Pat. No. 7,770,200 on Aug. 3, 2010, and incorporated by reference herein in its entirety. The foregoing disclosure teaches, inter alia, methods and apparatus for optimizing network bandwidth utilization by delivering to users only the minimum number of programs required by service provider policies. These methods and apparatus are useful so as to minimize bandwidth consumption while also maximizing subscriber satisfaction and service level (e.g., video and/or audio quality). The disclosed methods and apparatus are especially useful when programming consumption changes drastically, for example during so-called "primetime" viewing, as well as when programming bandwidth (as contrasted from consumption) varies dramatically, for instance, between delivery of standard definition and high definition programming. In one exemplary embodiment, a "forced delivery" approach is employed, wherein a copy of a program of a certain type is selected and delivered via one or more program channels. For example, a given program may be available in both a standard definition (SD) format and high definition (HD) format. Furthermore, different versions, such as MPEG2 and MPEG4 audio video control of SD and/or HD formats of programs may be available. If it is known that a group of user CPE in the service area are HD-capable, then the service may force the CPE of those users to tune to any available HD versions of programs to reduce the instances of duplicate programming, by satisfying SD programming requests using HD programming. Conversely, in times of constrained bandwidth, the SD version of a program may be delivered when an HD program is requested. If the user's CPE has up-conversion capability, the user may still advantageously experience "HD-quality" video, even though the CPE input has been switched to SD. As other alternatives, a technique know as "re-binding", or alternatively a payload substitution, may be used in place of a forced re-tuning consistent with the invention. In other embodiments, up-rating or down-rating of one or more program streams (i.e., changing the bitrate up or down)) can be used to temporarily or even indefinitely accommodate periods of increased or reduced network capacity, respectively. This "trans-rating" may be accomplished dynamically and according to any number of different implementation schemes. For example, in one variant of the invention, the system cannot only down-rate and up-rate content bitrates, but also has knowledge of when to perform such rate changes (such as based on e.g., a priori knowledge of content bitrate profiles via metadata or the like, or predictive analysis of historical tuning and/or bandwidth consumption data). Moreover, the system can intelligently select content encoding or resolution formats to switch to when bitrate or other changes are needed. These rate and/or format changes can be inserted dynamically; i.e., during subscriber viewing.

Accordingly, when these techniques of format selection, selective "steering" of viewers to existing QAMs, re-binding, and/or transrating are employed with the predictive selection techniques of the present invention, a powerful combination results. Specifically, the server process 452 according to such a configuration can not only select which programs should be predictively inserted at any given time (based on e.g., historical data), but can also select which QAM the program stream is bound to, what format the bound stream should be delivered in (e.g., HD or SD), and which subscribers should be switched onto that stream when multiple requests for it actually do arise. Such capability is heretofore unknown in the prior art.

It will be appreciated that certain individuals (or for that matter certain demographic/geographic/psychographic/logical slices of the subscriber pool) may exhibit very predictable or patterned behavior, which can also be identified by way of various mechanisms. For example, in one variant of the present invention, the server process 452 is adapted to utilize the anonymous hashed TUNER ID, TUNER USE or MAC ID variables set forth in co-owned U.S. patent application Ser. No. 11/186,452 filed Jul. 20, 2005 and entitled "METHOD AND APPARATUS FOR BOUNDARY-BASED NETWORK OPERATION", which is incorporated herein by reference in its entirety. This application discloses, inter alia, the ability to individually and specifically target user CPE (e.g., their tuner stages) within portions of the network, so that virtual boundaries or subsets within the subscriber base are formed, such as where subscribers in different geographical regions require different programming. Specifically, in the context of the present invention, the server historical database can be maintained on a per-user basis if desired, with entries in the database being logically coupled to a specific subscriber's hashed TUNER ID, etc. In this way, the MSO can maintain anonymous historical data on a given subscriber's tuning habits, which can then be used by the server process 452 to adjust its behavior as described elsewhere herein. For example, if the subscriber associated with hashed TUNER ID 1011101011001101 (exemplary binary hashed format) religiously views a certain program every Thursday night at 9:00 pm, this information can be used by the server process in its anticipatory decisions on program (and optionally bandwidth) allocation or program delivery to the hub servicing that subscriber/TUNER ID. One such use may comprise segregating or grouping such users into a given service group, which would characteristically have very low variability.

Moreover, using this approach, the MSO or other network operator can, in the context of the present invention, readily adjust the selected subscriber base from which it gathers data based on geography, demographics, and/or psychographics, all in a completely anonymous fashion. This capability provides the MSO with a sophisticated tool by which they can examine individual "slices" of the subscriber pool in an anonymous and substantially real-time fashion to better evaluate prospective anticipatory program stream shaping by the intelligence algorithms of the server process 452.

It can be appreciated that while the foregoing embodiments contemplate identification of viewership data (e.g., which channels or programs were watched when) on an individual or per-viewer basis, this is by no means a requirement of practicing the invention. For example, in one variant, viewership data for individual viewers within a given service group or subnetwork portion is received and stored on a per-viewer basis, and then subsequently used by the server process 452 to make predictive decisions regarding content insertion for that service group or subnetwork portion. This approach generally produces the highest predictive accuracy, since the data on which the predictive decisions are made is data from those who will ultimately use the predictively inserted content; i.e., the data generator and user are highly correlated.

However, in other variants, such a high level of correlation need not be maintained, especially where other operational or business goals must be considered, or where it has been demonstrated that a particular metric or parameter of interest is not well correlated or independent of the data source. For example, it may be known that a given percentage of viewers will tune into or request an sporting event at a certain time irrespective of which service group, geographic location, or subscription level they belong to. Hence, in such a case, there is no requirement that the server process 452 access and evaluate data for the particular service group being served, since in effect the answer will be the same regardless of which historical data is analyzed. Accordingly, in one embodiment of the invention, the server process 452 is adapted to look for artifacts, patterns or correlations within the data not only on a per-service group or per-subnetwork basis, but also across the broader database of viewership data so as to identify "global behaviors" or patterns. This analysis can be performed in the background, such as periodically or when new viewership data updates are received. This sort of pre-processing relieves the server process 452 in some cases from having to do more intensive "on the fly" processing, which may feasibly introduce some latency by delaying decisions on predictive insertion.

Figure 6:
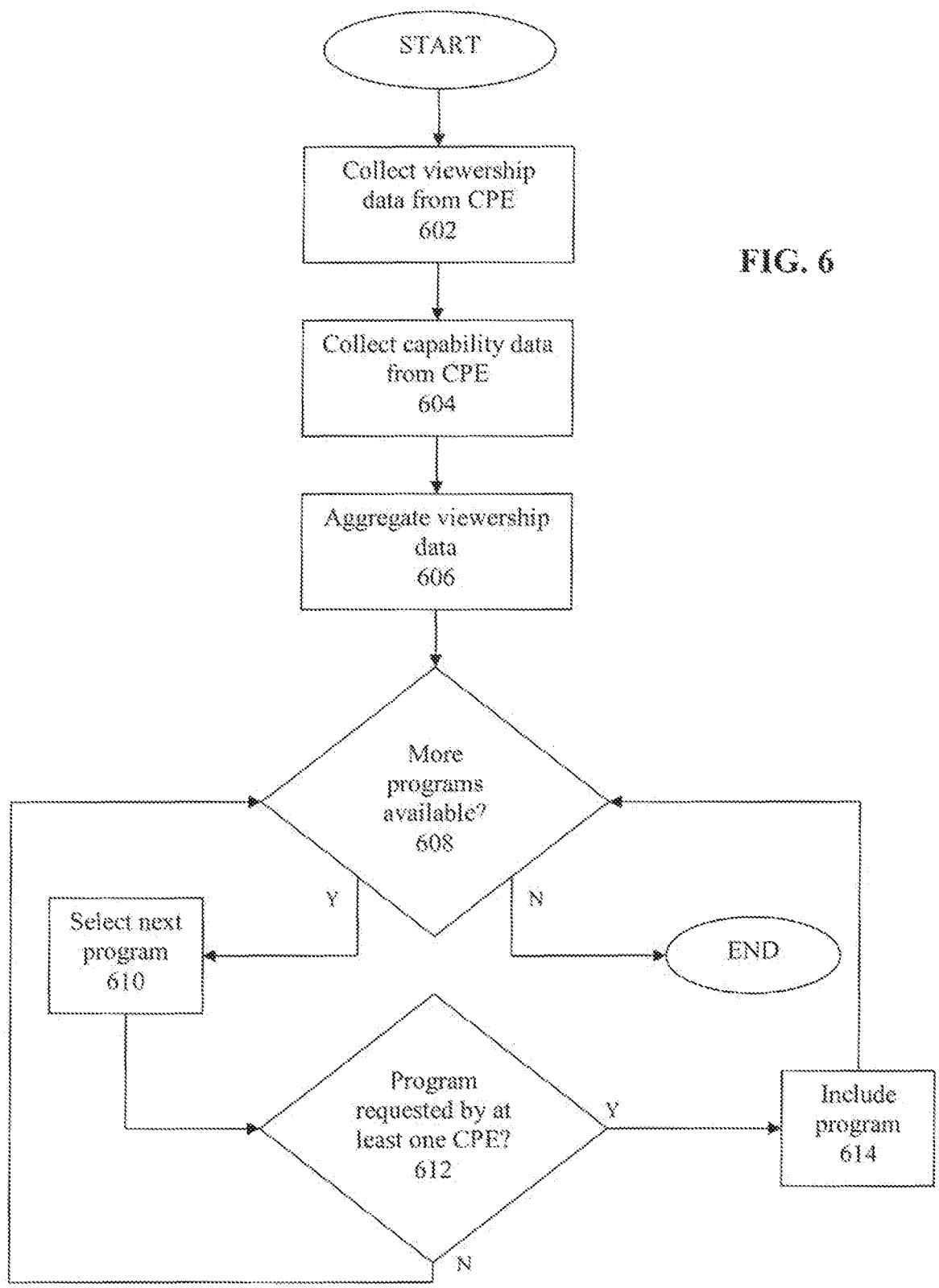
FIG. 6 is a logical flow diagram illustrating one embodiment of the method of determining a content stream according to the present invention.

FIG. 6 is a flow diagram illustrating a method of selecting content for inclusion within a content stream 606 according to one embodiment of the present invention. First, viewership data is collected from each CPE 106 in a subnetwork at step 602 (or at least a subset thereof). Optionally, at step 604, the capabilities of each CPE 106 may also be collected.

Figure 7:
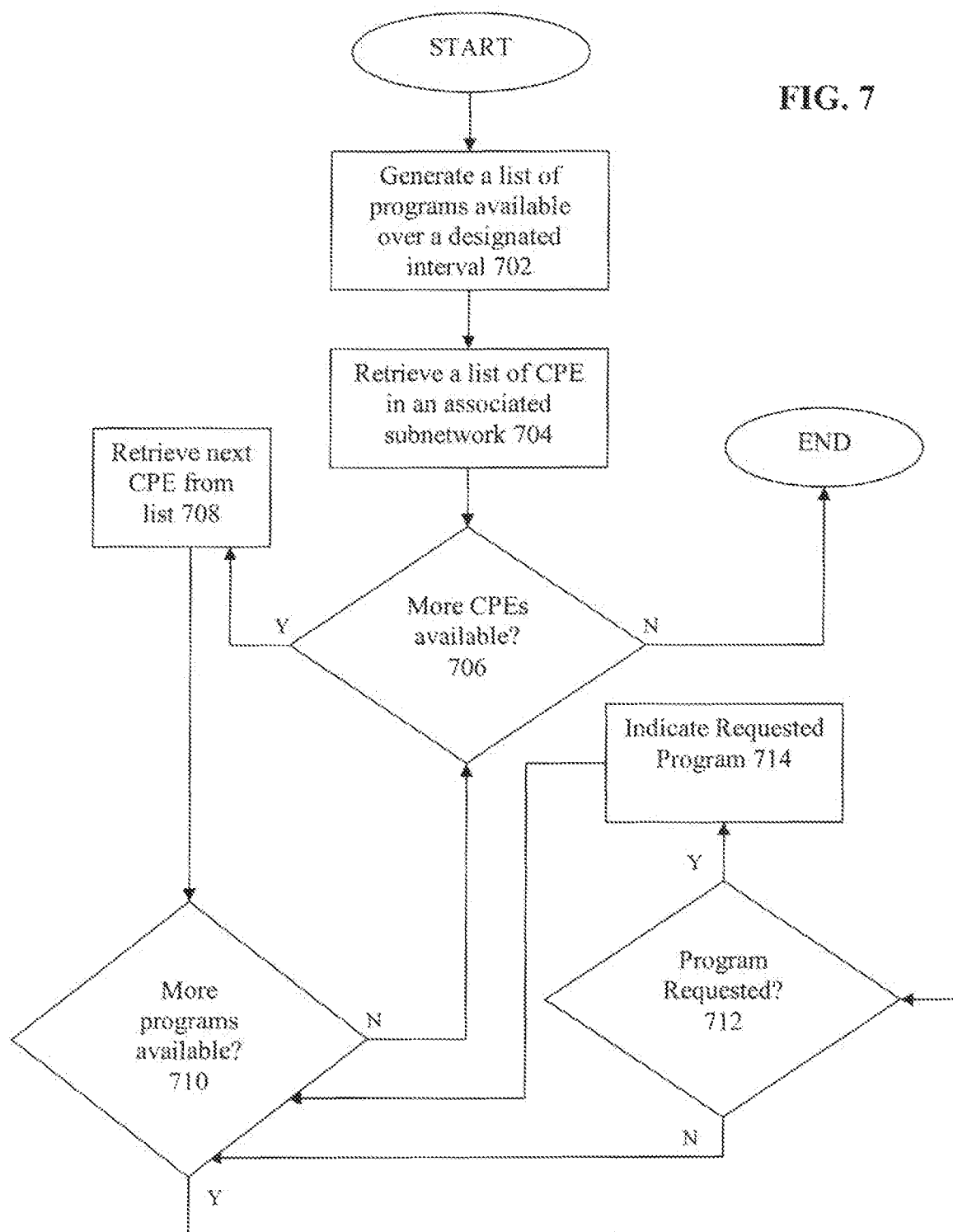
FIG. 7 is a logical flow diagram illustrating one embodiment of the aggregation method useful with the present invention.

The viewership data is then aggregated at step 606. This aggregation process may occur in a myriad number of ways and over any number of designated intervals. According to certain embodiments, the method aggregates one or more archived files (preferably stored within the node comprising a server process 452) and the viewership data associated with each CPE 106. In one variant, the archived file reflects the viewing histories of all or subsets of CPE 106 in a subnetwork over an extended period of time (for example, the viewing histories of all subscribers in the subnetwork over the last three years), while the viewership data of each CPE 106 reflects the viewing history of one particular CPE 106 over a recent period of time (for example, the viewing history of the last two weeks). A simple aggregation process according to one embodiment is illustrated in FIGS. 7 and 8, discussed in further detail subsequently herein.

In order to determine the appropriate content stream 606 to be broadcast, the exemplary method of FIG. 6 steps through every available program (or designated subsets of the available programs) over a given interval, and determines if that program was requested on a prior occasion. This is illustrated in FIG. 6 as steps 508-512. If the program was requested, it is included in the content stream 506 at step 614. When the list of programs to be evaluated has finally been exhausted, the process then terminates.

Note that in more advanced embodiments, multiple iterations or "case" specific logic is used to determine the appropriate content 506 to broadcast to the subnetwork. These embodiments are particularly useful when cable channels change their program lineups and reschedule programs from one time slot to another based on factors such as popularity or in order to create time for new shows. These embodiments handle situations where subscribers exhibit proclivities to request programs that are broadcast within a certain a time slot (as opposed requesting a specific program whenever it is broadcast). For example, a certain set of subscribers may watch any content broadcast at 7:00 p.m., after these subscribers get home from work, but nothing at 2:00 a.m., when they sleeping. In these situations, one case or method may create predictions based on the recurring programs (programs whose time slots have not changed from the last recorded period), and a separate case or method may handle situations where programs have been rescheduled to a new time slot. The resulting predictions will usually be more accurate than predictions based on a universal or non-case specific approach, since the logic creating the predictions has taken the aforementioned proclivities into account.

New programs also require special consideration. If a program is new, past viewing patterns generally cannot be accurately relied upon to predict whether the program will be requested by a certain set of subscribers. According to some embodiments of the invention, new programs will default to a certain automatic setting. In some variants, new programs default to being included in the delivered content stream, while in other variants, new programs default to being excluded from the content stream. Note also that while there is no directly applicable history or patterns for a "new" program, there may be closely related or similar genre programs whose historical data is useful. For instance, while "Survivor: [Location 5]" may be new, it still may bear significant tangency and relation to "Survivor: [Locations 1-4]", and hence the data for the latter may be very relevant, at least for a first prediction approximation, to the former.

Furthermore, according to some embodiments, titles and/or descriptive codes are used to match up scheduled programs to programs broadcast from prior periods for the purposes of determining whether a scheduled program is to be considered "new", and/or what sources of historical data may be applicable for purposes of prediction. For example, in one variant, metadata associated with a particular program is evaluated by a human (or search engine) to find related concepts. For instance, the movie "Alien versus Predator" might have metadata characterizing the movie as "aliens/outer space" and "science fiction", and this could be matched to historical data for other programs that are classified as both relating to aliens/outer space and science fiction. In other embodiments, each program comprises an encoding, metadata, flag, register field, or other marker indicating whether or not the program is "new." Programs may also be rated or evaluated on a linear or other scale as to their "newness" (i.e., similarity to other programs that are not identical). For example, a 1 to 10 rating system could be applied, the rating assigned either by a human (e.g., heuristically) or algorithmically based on predetermined criteria such as for example the number of metadata matches, similarity of source/topic, etc. Any number of ways of evaluating two or more programs for similarity can be appreciated by those of ordinary skill, and accordingly are not described further herein.

In various embodiments, predictions concerning whether a new program will be requested depend on a variety of factors, such as without limitation scheduled time slot, channel popularity, cast, rating, or program content. For example, an analysis of certain criteria may indicate that new program X on channel 21 at 7:00 pm is likely to be requested, but new program Y on channel 843 at 2:00 am is not likely to be requested. These embodiments advantageously allow separate predictions to be made for each program, which in turn yields a more accurate prediction model.

FIG. 7 is a flow diagram illustrating one embodiment of a data aggregation method useful with the present invention. In step 702, a list of all programs available over a designated period is generated. In some embodiments, this list is a standard cable channel grid or cable guide (such as from the EPG). In other embodiments, an algorithm generates this list upon requesting schedules from one or more remote sources.

In step 704, a list of CPE 106 in a given network portion (subnetwork) is retrieved. In some embodiments, the list comprises all CPE 106 residing in the designated subnetwork. In other embodiments, the list comprises a subset of all CPE 106 in the subnetwork; for example, only those CPE 106 which are currently powered on with an active network connection. Moreover, in some embodiments, the aforementioned list is stored locally within a node comprising a server process 452. In other embodiments, the list is formed by having a remote node send a signal (such as a ping) to all CPE 106 in the subnetwork. In still other embodiments, the list is formed by having a remote node receive signals from all CPE 106 that have registered during an initialization or bootup process. Yet other approaches for assembling the list will be appreciated by those of ordinary skill.

The method of FIG. 7 steps through each CPE 106 in the list until the list is completed. This process is illustrated in steps 706-708 of FIG. 7. For each CPE 106 in the list, the method steps through the programs in a designated interval and determines whether or not the CPE 106 requested that program when it was available. This process is shown in steps 710-712 of FIG. 7.

If a certain program was requested, this is indicated accordingly per step 714. In some embodiments, a master table is used to record these indications. In one variant, the master table is continually updated per each indication of a requested program. In other variants, a file is created locally comprising a record of all indications of requested programs with respect to a particular CPE 106. The file is subsequently transmitted to a remote node as a single data stream or structure, and the remote node then updates the master table accordingly.

FIG. 8 shows the result of aggregating the viewership data of two CPE 502(1) and 502(2) according to the aforementioned method. In FIG. 8, three letters (e.g., "abc") represent an available program. If the letters appear in bold, this indicates that the program was requested by the subscriber at the indicated time. Note that a given CPE 106 may request more than one program at a given timeslot. This may occur, for example, when a subscriber has a CPE 106 with DVR capability or multiple tuners, and thus can view a program broadcast on one channel while simultaneously recording a program on another channel.

The resulting aggregated data is then stored in the aggregated data table 802 shown in FIG. 8. This data includes a listing of all programs watched at a given time period for the set of CPE 106 that were aggregated. After all of the relevant data has been aggregated, one or more algorithms can then process this data in a myriad number of ways in order to determine the appropriate content to be broadcast (see infra, FIG. 6. and accompanying discussion).

Bandwidth "Defragmentation"—

In another aspect of the invention, methods and apparatus for defragmentation of bandwidth are disclosed. In one embodiment, the apparatus comprises a software routine or application; e.g., a module of the aforementioned server process 452, although other approaches (including stand-alone applications and devices) may also be used. The primary function of the bandwidth defragmenter (not shown) is to rescue "stranded" bandwidth which accumulates over time, much akin to the way HDD storage fragments and accumulates over time when operating a PC or other computerized device. For example, a typical QAM may be able to early 10 SD streams (3.75 Mbps each, or 37.5 Mbps total), or alternatively 2 HD streams (15 Mbps each, or 30 Mbps total). Cable signals are transmitted using a Quadrature Amplitude Modulation (QAM) scheme, and hence the available payload bitrate for typical modulation rates (QAM-256) used on HFC systems is roughly 38 Mbps. Therefore, if a QAM is carrying the aforementioned 10 SD streams, very little bandwidth will be stranded. However, if that same QAM were carrying the 2 HD streams, then about 8 Mbps is left "stranded" (38 Mbps–30 Mbps=8 Mbps). If this stranded 8 Mbps were identified, it could be filled with 2 SD streams (7 Mbps), thereby stranding about 1 Mbps.

The algorithm of the present invention accordingly performs three (3) primary functions: (i) identifies "stranded" bandwidth (i.e., that which is not suitable for delivery of desired content, such as an HD or SD program stream); (ii) determines an optimal, or at least more optimal, configuration for the program streams being delivered in order to free up at least a portion of the stranded bandwidth (which may include without limitation moving the streams to different QAMS, changing the encoding rate, type of encoder, etc.); and (iii) affirmatively implements the foregoing configuration changes; e.g., causes movement of the program streams among QAMs. These functions are implemented consistent with desired business or operational goals, such as e.g., maximizing delivery of HD streams to subscribers given existing bandwidth constraints.

The aforementioned algorithm is also responsible for generating (or causing to be generated via a proxy, such as the aforementioned server process 452) updated channel maps for transmission downstream to the CPE 106.

Exemplary methods and apparatus for QAM program stream and bandwidth allocation that may be used consistent with present invention are described in co-owned U.S. patent application Ser. No. 10/881,979 entitled "METHOD AND APPARATUS FOR NETWORK BANDWIDTH ALLOCATION" filed Jun. 29, 2004, issued as U.S. Pat. No. 8,843,978 on Sep. 23, 2014, incorporated herein by reference in its entirety. However, in the present context, the server process 452 (optionally in conjunction with the defragmentation algorithm) is predictively filling in or recovering stranded bandwidth; i.e., with unrequested programs. Hence, in one variant, the two processes (server and defragmenter) cooperate to service all pending program stream requests, and optimize the use of any remaining bandwidth for predictive delivery of non-requested programs.

Moreover, the server process 452 and defragmenter of the present embodiment can advantageously operate across multiple services within the network (e.g., BSA, VoD, etc.), such as in conjunction with a VoD session resource manager (SRM).

Network Server Device—

Figure 9:
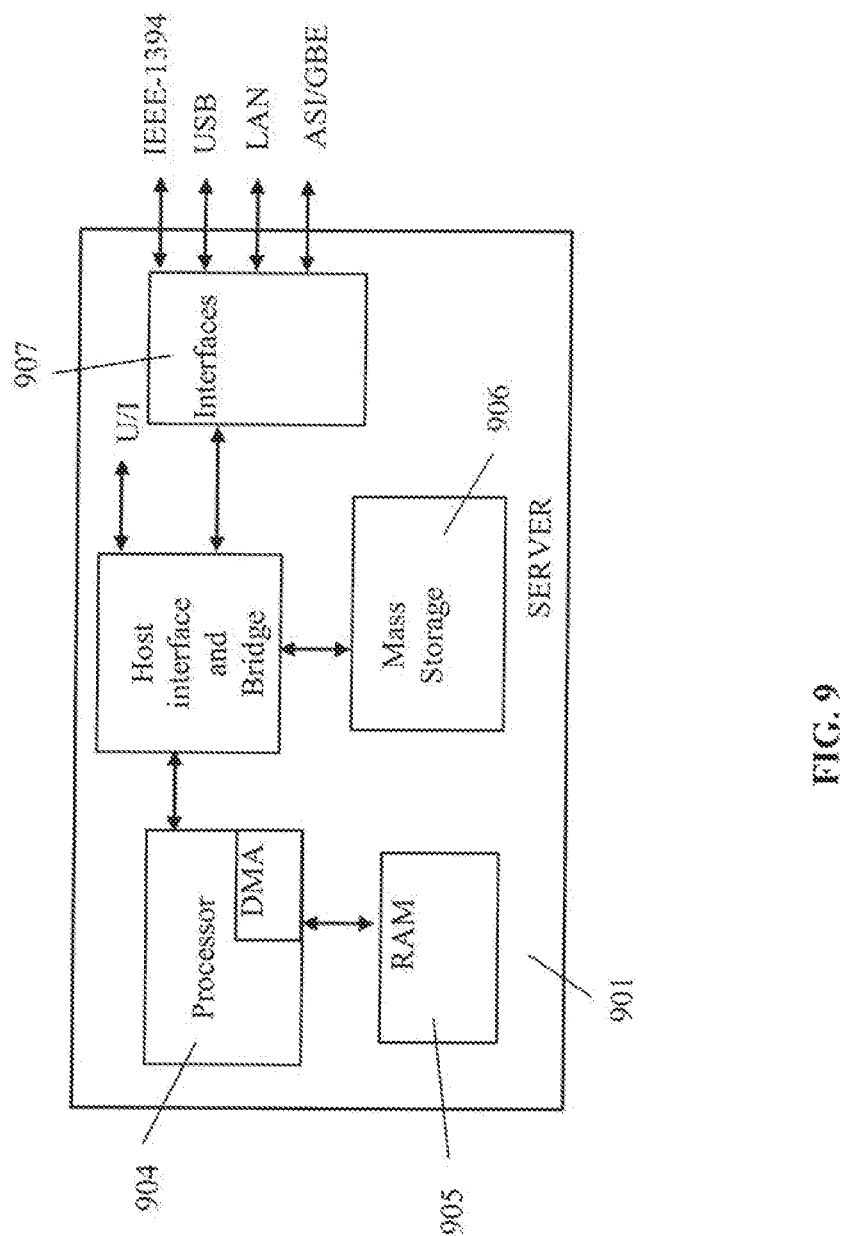
FIG. 9 is a block diagram illustrating a server device per one embodiment of the present invention.

Referring now to FIG. 9, one embodiment of the improved network server device with predictive capability according to the present invention is described. As shown in FIG. 9, the device 901 generally comprises and OpenCable-compliant BSA network server module 196 adapted for use at the hub site of FIG. 1c (or FIG. 4), although the server may comprise other types of devices (e.g., VOD or application servers) within the network as previously described.

The server 901 comprises a digital processor(s) 904, storage device 906, and a plurality of interfaces 907 for use with other network apparatus such as QAM combiners, IP routers and other packet network devices, network management and provisioning systems, local PCs, etc. Other components which may be utilized within the server device 901 include amplifiers, board level electronic components, as well as media processors and other specialized SoC or ASIC devices. Support for various processing layers and protocols (e.g., 802.3, DOCSIS MAC, OOB channels, DHCP, SNMP, H.323/RTP/RTCP, VoIP, SIP, etc.) may also be provided as required, such as in support of data and "rules" interchange between the server 901 and the CPE. The server process 452 is also disposed to run on the server module 901, and to provide if applicable a functional interface with the client process 454 on the network CPE 106, or other interposed entities. These components and functionalities are well known to those of ordinary skill in the cable and embedded system fields, and accordingly not described further herein.

The server device 901 of FIG. 9 may take any number of physical forms, comprising for example one of a plurality of discrete modules or cards within a larger network edge or hub device of the type well known in the art. The server may also comprise firmware, either alone or in combination with other hardware/software components such as those previously described (e.g., disposed in the aforementioned edge device). Alternatively, the server module 901 may be a stand-alone device disposed at the hub or other site, and may even include its own RF front end (e.g., modulators, encryptors, etc.) or optical interface so as to interface directly with various portions of the HFC network 101. Numerous other configurations may be used. The server device 901 may also be integrated with other types of components (such as satellite transceivers, encoders/decoders, etc.) and form factors if desired.

It can also be appreciated that the methods of the present invention may be practiced using any configuration or combination of hardware, firmware, or software, and may be disposed within one or any number of different physical or logical entities. For example, the data receipt, analysis, and control parameter generation functionality described above may take the form of one or more computer programs (e.g., the server and any client processes, 452, 454). Alternatively, such computer programs may have one or more components distributed across various hardware environments at the same or different locations, such as where the server process 452 is distributed across multiple platforms at the hub site and the headend 150.

As yet another example, portions of the functionality may be rendered as a dedicated or application specific IC having code running thereon. Myriad different configurations for practicing the invention will be recognized by those of ordinary skill in the network arts provided the present disclosure.

According to a preferred embodiment, the instructions comprising the server process application 452 are stored in the mass storage device 906 and subsequently loaded into the memory device 905 by the processor 904. As previously described, the server process 452 is a process adapted to gather data from a plurality of nodes in a subnetwork, analyze the data, and optimize bandwidth allocation based upon this analysis. In many embodiments, the data collected comprises viewership data 502 (i.e., data indicating which programs were requested by certain CPE 106 at various times of the day) and optionally, may also comprise capability data 504 (i.e., data indicating the capabilities of a particular CPE, such as its display, storage, transmission, and decoding capabilities).

According to some embodiments, once all of the necessary data is gathered, the server process 452 searches for viewing patterns or associations within it. According to one variant, these patterns include temporal/program correlations; e.g., repeated requests of programs at a certain hour, day, week, month, or time of the year. For example, the viewership data 502 may indicate that program X (alternatively, channel X) is always requested by at least one user in the subnetwork at 3:30 on Sundays. This pattern would indicate to the server process 452 to consider providing this content at 3:30 every Sunday. Since future viewing patterns may subsequently change, the server process 452 may update its predictions upon receiving the most recent viewing patterns at a later date, or other information which may alter the aforementioned prediction.

Note also that according to some embodiments, thresholds are used by the server process 452 in order to determine whether content should be broadcast. For example, assuming that the only criterion used for predicting whether or not to broadcast a program at 1:00 p.m. on a given Saturday is that the program was requested at 1:00 p.m. during the last 9 out of 10 Saturdays. Based on such historical data, there could be considered a 90% likelihood that the program will be requested (although this may not be a true probability). A server process 452 with a threshold set at 85% "probability") decides to broadcast this program at 1:00 p.m. during that Saturday. However, if the threshold is set at 95%, the server process 452 decides not to broadcast that program. Clearly, this approach can be extended to multiple criteria or parameters; e.g., four of five criteria must be net to at least their respective prescribed thresholds before the program is selected for broadcast. Each of the individual criteria may also be weighted (e.g., made comparatively more or less important in the overall result).

Also, according some embodiments, patterns are weighted accordingly before predictions are generated by the server process 452. For example, suppose a pattern is identified indicating that Program Y has been requested every Sunday at 7:00 p.m. for the last nine months. However, another pattern is identified indicating that every year, during Christmas Sunday, Program Y is never requested. With respect to an upcoming Christmas Sunday, the server process 452 may give more weight to the second pattern, and thus decide not to provide Program Y in the content stream. In some variants, this weighting is accomplished by a priority listing. In other variants, numeric scalars are used to provide such weights.

In one embodiment, viewership data is aggregated before predictions are made by the server process 452. Aggregating data in this matter may yield efficiency gains if the complexity of the aggregation algorithm is less than the complexity associated with aggregating predictions generated from viewership data individually with respect to each CPE 106. Exemplary methods for aggregating data have been discussed herein; see infra, FIGS. 7 and 8 and accompanying discussion.

Furthermore, in certain embodiments, the server process 452 is further adapted to predict the bandwidth available on the network over a certain period of time. In one variant, this is accomplished by determining the bandwidth required for each program predicted to be requested over a certain time period, and subtracting this amount from the total available bandwidth during that time. This may be accomplished on most any time scale desired; e.g., such as instantaneous bandwidth data, or that aggregated and averaged over a finite period (e.g., 5 minutes). Note that the bandwidth required for each program may depend on the compression scheme utilized (e.g., MPEG2 or MPEG4) and the version of the program expected to be requested (e.g., a high definition or standard definition broadcast).

Conversely, in those embodiments where capability data is gathered, this data may be used to select an optimal compression scheme or video content level for broadcasting content. Thus, if sufficient bandwidth is predicted to remain available over a designated period, and each CPE 106 in a subnetwork can support a high definition broadcast, the server process may select a high definition version of a certain program. This is especially true if others in the same subnetwork can be migrated onto the HD broadcast. Conversely, if a CPE suddenly tunes to the high definition broadcast, assuming that this CPE cannot support the high definition version, a standard definition equivalent of the same program may thereafter be substituted.

CPE—

Figure 10:
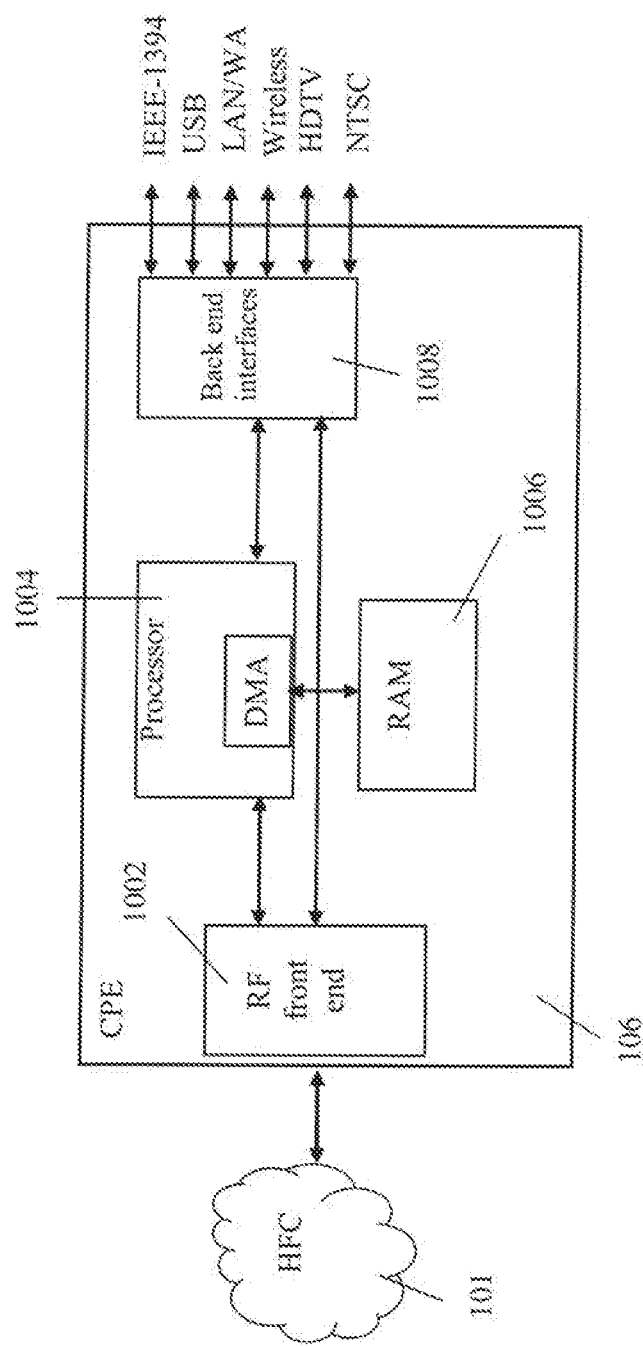
FIG. 10 is a block diagram illustrating a customer premises device per one embodiment of the present invention.

FIG. 10 illustrates an exemplary embodiment of the improved CPE 106 according to the present invention. As shown in the simplified diagram of FIG. 10, the device 106 generally comprises and OpenCable-compliant embedded system having an RF front end 1002 (including tuner and demodulator/decryptors) for interface with the HFC network 101 of FIGS. 1-1c, digital processor(s) 1004, storage device 1006, and a plurality of interfaces 1008 (e.g., video/audio interfaces, IEEE-1394 "Firewire", USB, serial/parallel ports, etc.) for interface with other end-user apparatus such as televisions, personal electronics, computers, WiFi or other network hubs/routers, etc. Other components which may be utilized within the device (deleted from FIG. 10 for simplicity) various processing layers (e.g., DOCSIS MAC or DAVIC OOB channel, MPEG, etc.) as well as media processors and other specialized SoC or ASIC devices. The CPE 106 may also comprise an integrated HD decoder, thereby relieving any connected monitors or other devices from the requirement of having such a decoder. These additional components and functionality are well known to those of ordinary skill in the cable and embedded system fields, and accordingly not described further herein.

The CPE 106 of FIG. 10 is also provided with an OCAP 1.0-compliant application and Java-based middleware which, inter alia, manages the operation of the device and applications running thereon (including the client process application 254). It will be recognized by those of ordinary skill that myriad different device and software architectures may be used consistent with the tuning functions of the present invention, the device of FIG. 4 being merely exemplary. For example, different middlewares (e.g., MHP, ARIB, or ACAP) may be used in place of the OCAP middleware of the illustrated embodiment.

The exemplary CPE 106 further comprises a conventional "Watch TV" application or the like, which services those program or user channels available over the network. The Watch TV application, residing in memory, provides such functions as channel navigation control, channel selection in response to a channel change event, etc. In one embodiment, the Watch TV application further comprises all necessary functionality need to support the client process 454 when the latter is deployed on the CPE 106. For example, the Watch TV or other application would include the necessary programming interfaces (APIs) to support the gathering of the necessary data for subscriber tuning or other activity as well as capabilities and other configuration-related information about the CPE, and communication of these data back upstream to the server process 452 and/or the headend process 450 (if used). As previously described, the "client portion" 452 of the server process, where used, may also be given varying degrees of capability itself, such as local processing of gathered data, implementation of an upstream communications multiple access scheme (e.g., so as to avoid overloading upstream communication channels with data messages, etc.).

In another embodiment, the CPE 106 comprises a converged premises device (CPD), such as for example that described in co-owned and co-pending U.S. patent application Ser. No. 11/378,129 filed Mar. 16, 2006 and entitled "METHODS AND APPARATUS FOR CENTRALIZED CONTENT AND DATA DELIVERY", incorporated herein by reference in its entirety. For example, this converged device may include the aforementioned client process functionality 454 running on the processor thereof. The converged device is remotely manageable and acts as a centralized client networking platform providing gateway services such as network management as well as traditional content and high-speed data delivery functions. The device also acts as the shared internet (e.g., Internet) connection for all devices in the premises via a cable modem or other such interface, sharing personal and DVR content such as video, music and photos (and any associated metadata) throughout the premises, and providing both a wired and wireless network in the home. The client process 454 of the present invention can, when used, therefore be used to control and configure the provision of data (such as e.g., the viewership data 502 and activity data 504 previously described) back upstream such as to the BSA hub process 452 and/or the headend process 450. The aforementioned converged device can also be optionally configured to provide viewership data, capability, and any other useful data relating to other devices within the premises network served by the converged device (e.g., DVRs, PCs, etc.).

It will also be recognized that the above-referenced converged premises device (CPD) may be capable of receiving and/or delivering content in more than one type of format. Accordingly, in another embodiment of the invention, the predictive algorithms previously described are configured to track when and what channel a given program of a given encoding (e.g., MPEG2, MPEG4, etc.) or resolution (e.g., bitrate, HD, SD, etc.) is predictively delivered, and subsequently use this information. In effect, use of the converged device with such capabilities permits the predictive delivery algorithms more latitude in servicing requests, since the converged device is somewhat of a "don't care" entity with respect to what encoding and/or bitrate of content it can receive. A typical STB with one type of codec and one available resolution (e.g., SD) in contrast requires much more specific control by the predictive algorithm to ensure that an appropriate format is delivered. Hence, the predictive delivery algorithm can for example provide predictive delivery of content in a single format which is suitable to the constrained one-format STB, as well as the converged device which can accept a number of formats, as opposed to perhaps requiring providing two different streams in two different formats which would consume additional bandwidth and resources.

Operations/Business Rules Engine—

In another aspect of the invention, the aforementioned server process 452 (e.g., rendered as one or more computer programs) optionally includes a business rules engine. This engine comprises, in an exemplary embodiment, a series of software routines running on the server device of FIG. 9 or other associated hardware/firmware environment adapted to control the operation of the predictive analysis and allocation algorithms previously described. These rules may also be fully integrated within the server process 452 itself, and controlled via e.g., a GUI on a PC connected to the server 901. In effect, the business rules engine comprises a supervisory entity which monitors and selectively controls, via the server process 452, the CPE data analysis and anticipatory control functions at a higher level, so as to implement desired operational or business rules. The rules engine can be considered an overlay of sorts to the algorithms of the server process 452 previously described. For example, the server process 452 may invoke certain operational protocols or decision processes based on data received from the CPE 106, as well as network operational data, demographic data, geographic data, etc. However, these processes may not always be compatible with higher-level business or operational goals, such as maximizing profit or system reliability. Hence, when imposed, the business/operational rules can be used to dynamically (or manually) control the operation of the server process 452, in conjunction with the operational "recommendations" generated by the server process 452 as part of its predictive analysis and control functions previously described.

For example, one rule implemented by the rules engine may comprise selectively switching certain broadcast channels to certain users first (e.g., those with a higher subscription priority or level) under bandwidth-limited cases, and only after this tier of users is satisfied, switching the channel to the remaining users.

Another rule might allow for the selective choice between two or more program streams that are eligible for predictive insertion or reclamation. For example, the streams may have different advertising loading, and hence it may be desirable (from an advertising revenue perspective to insert and maintain the more highly advertising-laden stream and drop one or more of the others, all else being equal.

Similarly, channels can be allocated to those users which, e.g., based on demographics, historical patterns, geographic area, etc. will make best use of the bandwidth in terms of monetary return, profit, or some other business performance metric. For example, it may be know through historical usage or purchase data that certain zip codes will tend to respond better to increased targeted advertising than other zip codes (say, due to the increased disposable income of residents in that zip code). Hence, an advertiser's budget is most effectively used when their advertisements are included in streams which are switched into such zip codes. An MSO might also be able to charge a premium rate for advertising for such channels, since the advertiser's expected yield is typically higher than for channels switched into other zip codes. Accordingly, the MSO might invoke a business rule that selectively and predictively switches channels carrying only "premium" advertisements into the best zip codes (or demographic slices), while switching channels with second-tier advertisements into other zip codes or demographic slices. Such switching to certain zip codes can be performed using, inter alia, the methods and apparatus set forth in U.S. patent application Ser. No. 11/186,452 entitled "METHOD AND APPARATUS FOR BOUNDARY-BASED NETWORK OPERATION", previously referenced and incorporated herein.

Many other approaches and combinations are envisaged consistent with the invention, as will be recognized by those of ordinary skill when provided this disclosure. An example is the application of business rules in cases of arbitration of edge QAM resource allocation between contending services such as BSA and VoD. Another example is the prioritization or assignment of a "grade of service" to a specific program supplier (e.g. The Golf Channel) for a fee. A non-blocking grade of service can thus be assigned to the programmer wherein content from that programmer is given first or high priority for predictive insertion, at the expense of non-insertion or removal of a lower priority programmer based on business rules. Enforcement of such business rules may be executed by servers separately for each service (e.g. BSA or VoD) or centrally via the controlling actions of a master SRM (Session and Resource Manager), BSA manager 450, or other agent.

For example, one rule implemented by the rules engine may comprise allocating remaining bandwidth (i.e., that over what is needed to service existing requests) that would normally be used to support predictive insertion of non-requested programs can also be dynamically re-allocated between more/less predictive insertion and less/more other uses, such as VoD or DOCSIS channels, trickle download, etc. For example, where a given prediction does not hold true (i.e., the prediction is not accurate in terms of request for a given program), other programs can be predictively inserted, or the non-requested program can simply be removed and the freed up bandwidth used for any other purpose.

Business Methods—

Moreover, effective capacity prediction may provide a greater ability to support extra services, e.g., using the extra capacity represented by the difference between the fixed bandwidth and the predicted bandwidth to support more content delivery requests. See e.g., co-assigned U.S. patent application Ser. No. 11/800,093 entitled "METHODS AND APPARATUS FOR PREDICTIVE CAPACITY ALLOCATION", issued as U.S. Pat. No. 9,398,346 on Jul. 19, 2016, previously incorporated herein. Various business models may be supported by such effective capacity prediction when used in conjunction with the predictive bandwidth analysis and allocation techniques described herein. For example, one such model may comprise using the extra capacity to promote the programs and/or services available to subscribers. To enhance utilization of this spare capacity, a special price or other incentives may be offered to encourage viewers to request movies or other content that can be serviced using the spare capacity of the system alone. Movies may, for example, be downloaded to subscribers' digital video recorder (DVR) devices at slower than real-time streaming rates (e.g., trickles), or high-speed downloads conducted in two or more bursts, compatible with the available excess capacity. The method may include network operators proactively sending content to subscribers' DVRs, based on knowledge of the subscribers' viewing or delivery preferences, using the excess or otherwise wasted capacity.

In another embodiment, extra bandwidth may be offered to Internet access subscribers at discounted rates or gratuitously, during portions of the day when extra bandwidth is available, so as to increase their satisfaction (e.g., higher download speeds). Extra bandwidth might also be selectively allocated to business-class customers (typically a high profit margin) before allocation to residential customers.

It will also be recognized that subscriber participation in obtaining viewership data of the type described herein may be provided on an "opt-in/out" basis, and may also be the subject of consideration, or an incentive or payment program; e.g., subscribers opting in and providing their viewership data may receive special promotional features or capabilities, reductions or offsets of their monthly subscription costs, etc.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A computerized client apparatus for use in a content delivery network, the computerized client apparatus configured to operate to provide digitally rendered content without an upstream communication channel, comprising:
   at least one data interface configured to receive at least one or more signals from an entity of the content delivery network, the at least one or more signals comprising at least one radio frequency (RF) carrier having digitally rendered content encoded thereon, wherein the at least one RF carrier comprises an RF carrier currently being delivered;
   an RF tuner;
   processing apparatus;
   storage apparatus in data communication with the processing apparatus and comprising at least one computer program, the at least one program configured to, when executed on the processing apparatus:
   process data representative of a request for a channel or program;
   determine, based at least in part on the processing, that the channel or program request can be serviced locally by the computerized client apparatus; and
   based at least on a determination that the channel or program request can be serviced locally by the computerized client apparatus, cause the RF tuner to tune to the at least one RF carrier to service the request;
   wherein the determination that the requested channel or program request can be serviced locally is based at least on the requested channel or program having been predictively or speculatively inserted into the at least one RF carrier currently being delivered.

2. The computerized client apparatus of claim 1, wherein:
   the at least one program is further configured to, when executed on the processing apparatus:
   receive a local channel map via the at least one data interface; and
   the determination that the request can be serviced locally comprises access to the local channel map, the local channel map comprising at least one association between the channel or program and the at least one RF carrier, the access to the local channel map obviating a requirement for the computerized client apparatus to generate a communication and transmit the communication to an entity disposed upstream in the content delivery network relative to the computerized client apparatus in order to effect the causation of the RF tuner to tune to the at least one RF carrier to service the request.

3. The computerized client apparatus of claim 1, wherein the service of the request comprises replacement of a first format of the digitally rendered content with a second format of the digitally rendered content, the replacement based on the data associated with one or more capabilities of the computerized client apparatus.

4. The computerized client apparatus of claim 3, wherein the replacement of the first format of the digitally rendered content with the second format of the digitally rendered content comprises replacement of a lower quality version of the digitally rendered content with a higher quality version of the digitally rendered content based at least on: (i) the data associated with the one or more capabilities of the computerized client apparatus indicating the computerized client apparatus can accommodate the higher quality version, and (ii) sufficient bandwidth being available for the replacement of the lower quality version with the higher quality version.

5. The computerized client apparatus of claim 3, wherein the replacement of the first format of the digitally rendered content with the second format of the digitally rendered content comprises replacement of the digitally rendered content with a lower quality version of the digitally rendered content based at least on: (i) the data associated with the one or more capabilities of the computerized client apparatus indicating the computerized client apparatus is not capable of decoding or utilizing the higher quality version.

6. The computerized client apparatus of claim 1, wherein the computerized client apparatus comprises a converged premises device (CPD), the CPD comprising a centralized client networking platform configured to provide a shared Internet connection for all computerized devices in a premises in which the computerized client apparatus is disposed.

7. The computerized client apparatus of claim 1, wherein the predictive or speculative insertion the requested channel or program having been into the at least one RF carrier currently being delivered is based at least in part on at least user data associated with at least the computerized client apparatus, the user data indicative of a plurality of patterns, the plurality of patterns synthesized into a synthesized pattern, the synthesized pattern comprising assignment of one or more values indicative of a weight to each of the plurality of patterns.

8. The computerized client apparatus of claim 1, wherein the at least one program is further configured to, when executed on the processing apparatus:

transmit data relating to one or more capabilities of the computerized client apparatus to the entity of the content delivery network; and wherein the causation of the RF tuner to tune to the at least one RF carrier to service the request is based at least on the data relating to the one or more capabilities.

9. A computerized method for receiving digitally rendered content over a content delivery network, the computerized method comprising:

transmitting, by at least one computerized client device, data representative of a request for the digitally rendered content; and receiving, at the at least one computerized client device, information enabling the at least one computerized client device to tune to a multiplexed stream, the multiplexed stream comprising the digitally rendered content, the information configured based at least on the multiplexed stream currently being delivered to one or more other computerized client devices;

wherein delivery of the multiplexed stream currently being delivered to the one or more other computerized client devices is based at least in part on a prediction that the digitally rendered content would be requested by a plurality of computerized client devices at a then-current time.

10. The computerized method of claim 9, further comprising transmitting, by the at least one computerized client device, data associated with the at least one computerized client device to an entity of the content delivery network;

wherein the data associated with the at least one computerized client device comprises data indicating which of a plurality of channels or programs were requested at prescribed parts of at least one day.

11. The computerized method of claim 9, further comprising transmitting, by the at least one computerized client device, data relating to one or more capabilities of the at least one computerized client device;

wherein the information enabling the at least one computerized client device to tune to the multiplexed stream is configured based at least on the data relating to the one or more capabilities.

12. The computerized method of claim 11, wherein the data relating to the one or more capabilities comprises data relating to decoding capabilities of the at least one computerized client device; and the computerized method comprises:

causing tuning to the multiplexed stream, the tuning to the multiplexed stream comprising receiving the digitally rendered content currently being delivered within the multiplexed stream, the received digitally rendered content compressed by a codec, the codec selected based at least in part on the data relating to the decoding capabilities.

13. The computerized method of claim 11, wherein the data relating to the one or more capabilities comprises data relating to display resolution capabilities of the at least one computerized client device; and the computerized method comprises:

causing tuning to the multiplexed stream, the tuning to the multiplexed stream comprising receiving the digitally rendered content currently being delivered within the multiplexed stream, the received digitally rendered content comprising digitally rendered content of a particular bit rate, the particular bit rate based at least in part upon the data relating to the display resolution capabilities.

14. The computerized method of claim 9, wherein:

the at least one computerized client device comprises a computerized client device unable to perform communication to a network apparatus disposed upstream in the content delivery network relative to the at least one computerized client device;

the receiving of the information enabling the at least one computerized client device to tune to the multiplexed stream comprising receiving, at the at least one computerized client device, a local channel map, the local channel map required by the at least one computerized client device to tune to the multiplexed stream.

15. Computer readable apparatus comprising a non-transitory storage medium having at least one computer program thereon, the at least one computer program comprising a plurality of instructions, the plurality of instructions configured to, when executed by a digital processor apparatus:

cause transmission, from the at least one of the plurality of computerized client devices, of data representative of a request for digitally rendered content; and receive, at the at least one of the plurality of computerized client devices, a data structure, the data structure configured to enable the at least one of the plurality of computerized client devices to tune, without use of an upstream communication channel, to at least one radio frequency (RF) carrier having the digitally rendered content encoded thereon;

wherein the digitally rendered content comprises digitally rendered content encoded on the at least one RF carrier prior to the transmission of the data representative of the request based on a prediction or speculation that the digitally rendered content would be requested by the at least one of the plurality of computerized client devices.

16. The computer readable apparatus of claim 15, wherein the plurality of instructions configured to, when executed by the digital processor apparatus:

cause transmission of user data associated with at least one of the plurality of computerized client devices to an entity of the content delivery network, the user data useful to identify at least one recurring temporal period that exhibits a prescribed activity or behavior by at least one of the plurality of computerized client devices;

wherein the encoding of the digitally rendered content on the at least one RF carrier prior to the transmission of the data representative of the request is based at least in part on the identification of the at least one recurring temporal period; and wherein the prescribed activity or behavior by the at least one of the plurality of computerized client devices comprises one or more temporally correlated patterns associated with program usage by the at least one of the plurality of computerized client devices during a same time period of a same day on a recurring basis and relating to the digitally rendered content.

17. The computer readable apparatus of claim 16, wherein the user data is further useful to identify at least one other RF carrier or digital program that can be removed or deleted based on a prediction that there will be no requests for the at least one other RF carrier or the digital program during the at least one recurring temporal period.

18. The computer readable apparatus of claim 16, wherein the encoding of the digitally rendered content on the at least one RF carrier prior to the transmission of the data representative of the request is further based on a bandwidth predicted to be available in the content delivery network during the at least one recurring temporal period.

19. The computer readable apparatus of claim 15, wherein the plurality of instructions are further configured to, when executed by the digital processor apparatus:

cause transmission of data relating to one or more display resolution capabilities of the at least one of the plurality of computerized client devices; and wherein the digitally rendered content encoded on the at least one RF carrier prior to the transmission of the data representative of the request comprises digitally rendered content of a particular bit rate, the bit rate selected based at least on the data relating to the one or more display resolution capabilities.

20. The computer readable apparatus of claim 15, wherein:

the plurality of computerized client devices are part of a service group; and encoding of the digitally rendered content on the at least one RF carrier prior to the transmission of the data representative of the request is further based a prediction that a threshold number of the plurality of computerized client devices of the service group will request the digitally rendered content during the at least one recurring temporal period.

* * * * *